(12) United States Patent
Tabet et al.

(10) Patent No.: US 9,825,741 B2
(45) Date of Patent: Nov. 21, 2017

(54) INTERFERENCE MANAGEMENT IN A WIRELESS NETWORK

(75) Inventors: Tarik Tabet, Montreal (CA); Chandra Sekhar Bontu, Nepean (CA); Yi Yu, Irving, TX (US); Zhijun Cai, Euless, TX (US); Yi Song, Plano, TX (US); Masoud Ebrahimi Tazeh Mahalleh, Ottawa (CA)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

(21) Appl. No.: 13/360,399

(22) Filed: Jan. 27, 2012

(65) Prior Publication Data
US 2013/0089040 A1    Apr. 11, 2013

Related U.S. Application Data

(60) Provisional application No. 61/544,982, filed on Oct. 7, 2011.

(51) Int. Cl.
*H04W 72/04* (2009.01)
*H04L 5/00* (2006.01)

(52) U.S. Cl.
CPC .......... *H04L 5/0048* (2013.01); *H04L 5/0073* (2013.01); *H04L 5/0053* (2013.01); *H04W 72/0406* (2013.01)

(58) Field of Classification Search
USPC ................................ 370/329, 336; 455/501
See application file for complete search history.

(56) References Cited

U.S. PATENT DOCUMENTS

| 8,902,842 B1 | 12/2014 | Gomadam et al. |
| 2008/0108363 A1 | 5/2008 | Yu et al. |

(Continued)

FOREIGN PATENT DOCUMENTS

| CN | 101924610 A | 12/2010 |
| CN | 102065465 A | 5/2011 |

(Continued)

OTHER PUBLICATIONS

3GPP; Evolved Universal Terrestrial Radio Access (E-UTRA);Physical layer measurements; TS 36.214 V9.1.0 (Apr. 2010), 15 pages.

(Continued)

*Primary Examiner* — Kevin C Harper
*Assistant Examiner* — Derrick V Rose
(74) *Attorney, Agent, or Firm* — Conley Rose, P.C.; J. Robert Brown, Jr.

(57) ABSTRACT

A method for interference management at a network element within a wireless telecommunications network, and the network element and user equipment, the method coordinating transmission of cell specific resource elements with at least one other network element; and transmitting the cell specific resource element to a user equipment concurrent to a resource element transmission from the at least one other network element. Also a method for interference avoidance at a network element operating within a wireless telecommunications network, and the user equipment and network element, the method receiving interference information from a user equipment; providing the interference information to at least one interfering network element; and precoding transmissions to the use equipment for interference cancellation.

12 Claims, 13 Drawing Sheets

(56) References Cited

U.S. PATENT DOCUMENTS

| | | | |
|---|---|---|---|
| 2010/0260059 A1* | 10/2010 | Zhang | H04W 52/327 370/252 |
| 2010/0267408 A1 | 10/2010 | Lee et al. | |
| 2011/0009137 A1* | 1/2011 | Chung | H04L 5/0048 455/501 |
| 2011/0038310 A1 | 2/2011 | Chmiel et al. | |
| 2011/0176499 A1* | 7/2011 | Siomina | G01S 1/042 370/329 |
| 2011/0268046 A1* | 11/2011 | Choi | H04L 5/0007 370/329 |
| 2012/0113843 A1 | 5/2012 | Watfa et al. | |
| 2012/0202540 A1* | 8/2012 | Lee et al. | 455/501 |
| 2012/0202558 A1 | 8/2012 | Hedberg et al. | |
| 2012/0213261 A1* | 8/2012 | Sayana | H04L 5/0094 375/224 |
| 2012/0281683 A1* | 11/2012 | Falconetti | H04J 11/0023 370/336 |
| 2013/0100901 A1 | 4/2013 | Shan et al. | |
| 2013/0114438 A1 | 5/2013 | Bhattad et al. | |
| 2013/0121276 A1 | 5/2013 | Kim et al. | |
| 2013/0208604 A1* | 8/2013 | Lee | H04L 25/0226 370/252 |
| 2013/0287064 A1 | 10/2013 | Seo et al. | |
| 2013/0315157 A1 | 11/2013 | Krishnamurthy et al. | |
| 2014/0036747 A1 | 2/2014 | Nory et al. | |
| 2014/0092827 A1 | 4/2014 | Jongren et al. | |
| 2014/0126402 A1 | 5/2014 | Nam et al. | |
| 2014/0126496 A1 | 5/2014 | Sayana et al. | |
| 2014/0185530 A1 | 7/2014 | Kuchibhotla et al. | |
| 2014/0187283 A1 | 7/2014 | Nimbalker et al. | |
| 2014/0321313 A1 | 10/2014 | Seo et al. | |
| 2014/0369293 A1 | 12/2014 | Guo et al. | |
| 2015/0139141 A1* | 5/2015 | Seo | H04J 11/005 370/329 |

FOREIGN PATENT DOCUMENTS

| | | |
|---|---|---|
| CN | 102158302 A | 8/2011 |
| CN | 102271109 A | 12/2011 |
| CN | 102714866 A | 10/2012 |
| CN | 102781098 A | 11/2012 |
| CN | 102792600 A | 11/2012 |
| KR | 20110040711 A | 4/2011 |
| WO | WO 2011046350 A3 * | 9/2011 |
| WO | 2011115421 A2 | 7/2012 |
| WO | 2012096476 A2 | 7/2012 |

OTHER PUBLICATIONS

3GPP; Evolved Universal Terrestrial Radio Access (E-UTRA);Physical layer procedures; TS 36.213 V9.1.0 (Apr. 2010), 81 pages.

3GPP; Evolved Universal Terrestrial Radio Access (E-UTRA);Requirements for support of radio resource management; TS 36.133 V9.3.0 (Apr. 2010), Part 1, 180 pages.

3GPP; Evolved Universal Terrestrial Radio Access (E-UTRA);Requirements for support of radio resource management; TS 36.133 V9.3.0 (Apr. 2010), Part 2, 183 pages.

3GPP; Evolved Universal Terrestrial Radio Access (E-UTRA);Radio Resource Control (RRC); TS 36.331 V9.4.0 (Sep. 2010), 252 pages.

R1-111561, 3GPP TSG-RAN WG1 Meeting #65, Renesas, Coordinated transmission in support of interference aware receivers, 7 pages.

J. Yue et al, Channel estimation and data detection for MIMO-OFDM systems, IEEE Globecom 2003, 5 pages.

J.W. Kim, C.K. Un, Noise subspace approach for interference cancellation, IEEE Electronics Letters, Issue 11, vol. 25, May 1989, 2 pages.

Pourahmadi, Vahid, et al.; U.S. Appl. No. 13/773,408, filed Feb. 21, 2013; Title: Methods of Interference Measurement for Advanced Receiver in LTE/LTE-A.

Pourahmadi, Vahid, et al.; U.S. Appl. No. 13/773,413, filed Feb. 21, 2013; Title: Interference Measurement Methods for Advanced Receiver in LTE/LTE-A.

Muruganathan, Siva Dharshan, et al.; U.S. Appl. No. 13/777,794, filed Feb. 26, 2013; Title: Methods of Inter-Cell Resource Sharing.

3GPP TS 36.331 V11.2.0; 3rd Generation Partnership Project; Technical Specification Group Radio Access Network; Evolved Universal Terrestrial Radio Access (E-UTRA); Radio Resource Control (RRC); Protocol Specification; Release 11; Dec. 2012; 340 pages.

3GPP TR 36.819 V11.1.0; 3rd Generation Partnership Project; Technical Specification Group Radio Access Network; Coordinated Multi-Point Operation for LTE Physical Layer Aspects; Release 11; Dec. 2011; 69 pages.

3GPP TS 36.213 V11.0.0; 3rd Generation Partnership Project; Technical Specification Group Radio Access Network; Evolved Universal Terrestrial Radio Access (E-UTRA); Physical Layer Procedures; Release 11; Sep. 2012; 143 pages.

3GPP TS 36.300 V11.3.0; 3rd Generation Partnership Project; Technical Specification Group Radio Access Network; Evolved Universal Terrestrial Radio Access (E-UTRA) and Evolved Universal Terrestrial Radio Access Network (E-UTRAN); Overall Description; Stage 2; Release 11; Sep. 2012; 205 pages.

3GPP TR 36.829 V11.0.0; 3rd Generation Partnership Project; Technical Specification Group Radio Access Network; Enhanced Performance Requirement for LTE User Equipment (UE); Release 11; Mar. 2012; 83 pages.

3GPP TS 36.211 V10.5.0; 3rd Generation Partnership Project; Technical Specification Group Radio Access Network; Evolved Universal Terrestrial Radio Access (E-UTRA); Physical Channels and Modulation; Release 10; Jun. 2012; 101 pages.

3GPP TS 36.423 V11.2.0; 3rd Generation Partnership Project; Technical Specification Group Radio Access Network; Evolved Universal Terrestrial Radio Access (E-UTRA); X2 Application Protocol (X2AP); Release 11; Sep. 2012; 136 pages.

PCT application No. PCT/US2012/022977, International Search Report and Written Opinion of the International Searching Authority, dated Sep. 27, 2012, 11 pages.

Samsung, "CRS interference cancellation in HetNet scenarios for UE performance", 3GPP TSG RAN WG1 Meeting #66, R1-112507, Aug. 22-26, 2011, 3 pages.

Intel Corporation, "Analysis of CRS and PDSCH collisions in Scenarios 3 and 4", 3GPP TSG RAN WG1 Meeting #66, R1-112226, Aug. 22-26, 2011, 6 pages.

LG Electronics, "Handling the legacy transmission in ABS", 3GPP TSG RAN WG1 Meeting #66, R1-112332, Aug. 22-26, 2011, 4 pages.

Catt, "Considerations on Interference Measurement and its Specification Impact in CoMP", 3GPP TSG RAN WG1 Meeting #66, R1-112110, Aug. 22-26, 2011, 5 pages.

Dahlman, Erik, et al.; "4G LTE/LTE-Advanced for Mobile Broadband"; Mar. 29, 2011; 61 pages.

3GPP TSG RAN WG1 Meeting #68bis; "UE-Specific DM-RS Configuration"; R1-121093; Jeju, Korea; Mar. 26-30, 2012; 4 pages.

PCT International Partial Search Report; Application No. PCT/US2013/071514; Mar. 7, 2014; 6 pages.

Office Action dated Aug. 1, 2014; U.S. Appl. No. 13/773,408, filed Feb. 21, 2013; 39 pages.

Office Action dated Jul. 16, 2014; U.S. Appl. No. 13/777,794, filed Feb. 26, 2013; 23 pages.

Office Action dated Aug. 1, 2014; U.S. Appl. No. 13/773,413, filed Feb. 21, 2013; 36 pages.

Final Office Action dated Jan. 12, 2015; U.S. Appl. No. 13/773,408, filed Feb. 21, 2013; 33 pages.

Final Office Action dated Oct. 20, 2014; U.S. Appl. No. 13/777,794, filed Feb. 26, 2013; 7 pages.

Advisory Action dated Dec. 9, 2014; U.S. Appl. No. 13/777,794, filed Feb. 26, 2013; 7 pages.

Final Office Action dated Jan. 12, 2015; U.S. Appl. No. 13/773,413, filed Feb. 21, 2013; 32 pages.

3GPP TSG RAN WG1 Meeting #70bis; "Association Between DM-RS Ports and EPDCCH Transmission"; R1-124242; San Diego, USA; Oct. 8-12, 2012; 4 pages.

(56) References Cited

OTHER PUBLICATIONS

3GPP TSG RAN WG1 Meeting #65; "Discussions on DL Control Signaling Enhancment"; R1-111789; Barcelona, Spain; May 9-13, 2011; 3 pages.
Xincheng, Zhang, et al.; "Reference Signal Design"; Excerpt from "LTE-Advanced Air Interface Technology"; CRC Press; Sep. 12, 2012; 29 pages.
3GPP TSG-RAN WG1 LTE Ad Hoc Meeting; "Combining Inter-cell-interference Co-ordination/avoidance with Cancellation in Downlink and TP"; R1-060200; Helsinki, Finland; Jan. 23-25, 2006; 3 pages.
PCT International Search Report; Application No. PCT/US2013/071514; dated Jun. 5, 2014; 6 pages.
PCT Written Opinion of the International Searching Authority; Application No. PCT/US2013/071514; dated Jun. 5, 2014; 9 pages.
PCT International Search Report; Application No. PCT/US2014/015839; dated Apr. 28, 2014; 4 pages.
PCT Written Opinion of the International Searching Authority; Application No. PCT/US2014/015839; dated Apr. 28, 2014; 7 pages.
PCT International Search Report; Application No. PCT/US2013/071672; dated Apr. 2, 2014; 3 pages.
PCT Written Opinion of the International Searching Authority; Application No. PCT/US2013/071672; dated Apr. 2, 2014; 8 pages.
Ohwatari, Yusuke, et al.; "Performance of Advanced Receiver Employing Interference Rejection Combining to Suppress Inter-cell Interference in LTE-Advanced Downlink"; IEEE; 2011; 7 pages.
3GPP TSG TAN WG1 #66bis; "Interference Measurement for Downlink CoMP"; R1-113091; Zhuhai, China; Oct. 10-14, 2011; 4 pages.
3GPP TSG RAN WG1 Meeting #64; "On Advanced UE MMSE Receiver Modelling in System Simulations"; R1-111031; Taipei, Taiwan; Feb. 21-25, 2011; 10 pages.
3GPP TSG RAN WG1 Meeting #63bis; "Interference Measurement Over Muted RE"; R1-110049; Dublin, Ireland; Jan. 17-21, 2011; 4 pages.
3GPP TSG RAN WG1 Meeting #61 bis; "Possibility of UE Side ICI Cancellation in Hetnet"; R1-103778; Dresden, Germany; Jun. 28-Jul. 2, 2010; 2 pages.
Advisory Action dated Mar. 12, 2015; U.S. Appl. No. 13/773,408, filed Feb. 21, 2013; 3 pages.
Notice of Allowance dated Jan. 23, 2015; U.S. Appl. No. 13/777,794, filed Feb. 26, 2013; 26 pages.
Advisory Action dated Mar. 16, 2015; U.S. Appl. No. 13/773,413, filed Feb. 21, 2013; 3 pages.
European Partial Search Report; Application No. 12837777.7; dated Feb. 20, 2015; 8 pages.
Thiele, Lars, et al.; "Interference Management for Future Cellular OFDMA Systems Using Coordinated Multi-Point Transmission"; IEICE Transactions of Communications; Dec. 2010; 10 pages.
Office Action dated Jun. 4, 2015; U.S. Appl. No. 13/773,408, filed Feb. 21, 2013; 32 pages.
Office Action dated Jun. 10, 2015; U.S. Appl. No. 13/773,413, filed Feb. 21, 2013; 26 pages.
European Extended Search Report; Application No. 12837777.7; Mar. 30, 2015; 16 pages.
Ruuska, Paivi, et al.; "Implementation Aspects of a 802.19.1 Coexistence System"; IEEE802.19-10/0165r1; Nov. 10, 2010; 25 pages.
Korean Office Action as Received in Co-pending Application No. 10-2014-7012259 dated Jul. 7, 2015; 5 pages. (No English translation available).
Pourahmadi, Vahid, et al.; U.S. Appl. No. 15/208,168, filed Jul. 12, 2016; Title: Interference Measurement Methods for Advanced Receiver in LTE/LTE-A; 91 pages.
3GPP TSG RAN WG1 #63bis; "Discussion on Transmission Mode for PUCCH Format 3"; R1-110391; Dublin, Ireland; Jan. 17-21, 2011; 3 pages.
Notice of Allowance dated Apr. 8, 2016; U.S. Appl. No. 13/773,408, filed Feb. 21, 2013; 15 pages.
Notice of Allowance dated Apr. 18, 2016; U.S. Appl. No. 13/773,413, filed Feb. 21, 2013; 15 pages.
European Examination Report; Application No. 12837777.7; Apr. 1, 2016; 5 pages.
Chinese Office Action as Received in Co-pending Application No. 201280049468.9 dated Feb. 29, 2016; 7 pages. (No English translation available).
Office Action dated Oct. 23, 2015; U.S. Appl. No. 13/773,408, filed Feb. 21, 2013; 37 pages.
Final Office Action dated Oct. 20, 2015; U.S. Appl. No. 13/773,413, filed Feb. 21, 2013; 37 pages.
Office Action dated Jan. 15, 2016; U.S. Appl. No. 13/773,413, filed Feb. 21, 2013; 21 pages.
Canadian Office Action; Application No. 2,902,445; Oct. 21, 2016; 5 pages.
Chinese Office Action as Received in Co-pending Application No. 201280049468.9 dated Oct. 8, 2016; 3 pages. (No English translation available).
3GPP TSG RAN WG1 Meeting #70bis; "Association Between DM-RS Ports and EPDCCH Transmission"; R1-124137; San Diego, USA; Oct. 3-12, 2012; 5 pages.
Office Action dated Jun. 16, 2017; U.S. Appl. No. 15/208,168, filed Jul. 12, 2016; 47 pages.
European Examination Report; Application No. 14707547.7; Apr. 5, 2017; 6 pages.
Chinese Office Action as Received in Co-pending Application No. 201380075826.8 on Jun. 19, 2017; 8 pages. (No English translation available).
Canadian Office Action; Application No. 2,849,070; Jun. 13, 2017; 3 pages.
Zhang, Xincheng, et al.; "LTE-Advanced Air Interface Technology"; CRC Press; Sep. 2012; 47 pages.
Chinese Office Action; Application No. 201380075851.6; dated Aug. 2, 2017; 26 pages.
Canadian Office Action; Application No. 2,902,445; dated Aug. 31, 2017; 4 pages.

\* cited by examiner ered the CSI-RS patterns;
INTERFERENCE MANAGEMENT IN A WIRELESS NETWORK

CROSS-REFERENCE TO RELATED APPLICATION

The present application claims priority to U.S. Provisional Patent Application No. 61/544,982 filed Oct. 7, 2011, by Tarik Tabet, et al., entitled "Interference Management in a Wireless Network", which is incorporated by reference herein as if reproduced in its entirety.

FIELD OF THE DISCLOSURE

The present disclosure relates to interference rejection techniques and in particular relates to coordinated interference rejection techniques.

BACKGROUND

Inter-cell interference management is a challenge when designing wireless cellular networks. Inter-cell interference impacts the reuse of system resources such as time, frequency, codes and space, by limiting the spectral efficiency and received signal to interference noise ratio (SINR). Efficient management of inter-cell interference can improve coverage, quality of communication, or user experience, as well as the overall capacity of network resources.

A basic approach to tackle interference in wireless networks is to assign orthogonal channels to adjacent evolved Node Bs (eNBs). However, in order to increase spectral efficiency, in many cases networks are tending to become single frequency networks (SFN). Moreover, heterogeneous cellular networks allow a macro cell to coexist with a small cell such as a femto-cell or a pico-cell or a micro cell, increasing the complexity of inter-cell interference. Therefore, for both homogenous and heterogeneous networks, inter-cell interference has become more complicated.

Interference cancellation techniques generally rely on pilots transmitted by adjacent cells that are orthogonal or exhibit good autocorrelation and cross correlation characteristics to estimate the parameters associated with the desired signals and the dominant interferers. While such techniques may apply for time divisional multiple access (TDMA) systems such as the global system for mobile communication (GSM) or in coded division multiple access systems (CDMA), the techniques may not be particularly useful for orthogonal frequency division multiplexing (OFDM). In particular, in OFDM systems, the channel estimation typically spans only few sub-carriers depending on the frequency selectivity of the channel and hence gains from the averaging of interference due to cross correlation of the pilot sequences of two adjacent cells may not be realizable. This may lead to an inaccurate interference estimation and make subsequent interference rejection at the UE unreliable.

BRIEF DESCRIPTION OF THE DRAWINGS

The present application will be better understood with reference to the drawings, in which.

DETAILED DESCRIPTION

Figure 1:
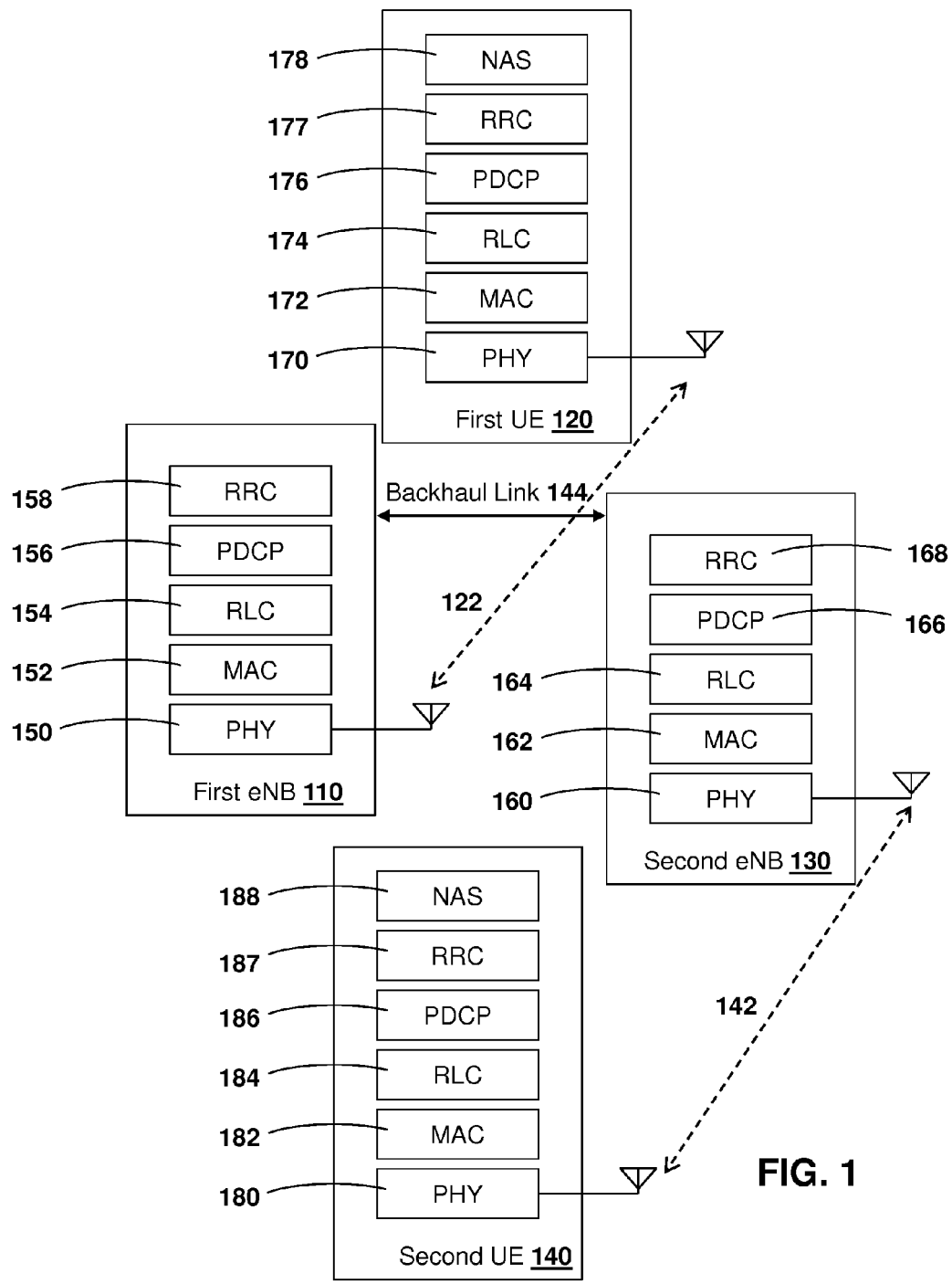
FIG. 1 is a block diagram illustrating communications between a first eNB and a User Equipment (UE) and a second eNB and UE.

The present disclosure provides a method for interference management at a network element within a wireless telecommunications network, the method comprising: coordinating transmission of cell specific resource elements with at least one other network element; and transmitting the cell specific resource element to a user equipment concurrent to a resource element transmission from the at least one other network element.

The present disclosure further provides a network element operating within a wireless telecommunications network, the network element comprising: a processor; and a communications subsystem, wherein the processor and communications subsystem are configured to: coordinate transmission of cell specific resource elements with at least one other network element; and transmit the cell specific resource element to a user equipment concurrent to a resource element transmission from the at least one other network element.

The present disclosure further provides a method for interference management at a user equipment operating within a wireless telecommunications network, the method comprising: receiving a cell specific resource element from a serving network node concurrently with a resource element transmission from at least one interfering network element; and estimating an interference covariance matrix for interference rejection combining based on the cell specific resource element from the serving network node and the resource element transmission from the at least one interfering network element.

The present disclosure further provides a user equipment operating within a wireless telecommunications network, the user equipment comprising: a processor; and a communications subsystem, wherein the processor and communications subsystem are configured to: receive a cell specific resource element from a serving network node concurrently with a resource element transmission from at least one interfering network element; and estimate an interference covariance matrix for interference rejection combining based on the cell specific resource element from the serving network node and the resource element transmission from the at least one interfering network element.

The present disclosure further provides a method for interference avoidance at a user equipment operating within a wireless telecommunications network, the method comprising: sending interference information from the user equipment to a serving network element; receiving concurrent transmissions from the serving network element and at least one interfering network element, the concurrent transmissions being precoded for interference cancellation; and cancelling the interference at the user equipment.

The present disclosure further provides a user equipment operating within a wireless telecommunications network, the user equipment comprising: a processor; and a communications subsystem, wherein the processor and communications subsystem are configured to: send interference information from the user equipment to a serving network element; receive concurrent transmissions from the serving network element and at least one interfering network element, the concurrent transmissions being precoded for interference cancellation; and cancel the interference at the user equipment.

The present disclosure further provides a method for interference avoidance at a network element operating within a wireless telecommunications network, the method comprising: receiving interference information from a user equipment; providing the interference information to at least one interfering network element; and precoding transmissions to the use equipment for interference cancellation.

The present disclosure further provides a network element operating within a wireless telecommunications network, the network element comprising: a processor; and a communications subsystem, wherein the processor and communications subsystem are configured to: receive interference information from a user equipment; provide the interference information to at least one interfering network element; and precode transmissions to the use equipment for interference cancellation.

A communication system typically comprises a plurality of evolved Node Bs and a plurality of mobile devices or user equipments (UEs). A UE will typically be served by a serving eNB and the UE can be transitioned to other eNBs when moving. Communications at the UE may be interfered with by other eNBs.

The embodiments described herein apply to both heterogeneous networks in which a macro-cell may include small cells such as a picto, femto or micro-cell, or to homogenous networks in which various eNBs either in the same or different radio access technology are configured.

Reference is now made to FIG. 1, which shows a simplified architecture for communication between various elements in a system. In particular, a first eNB 110 provides cell coverage to a first area and may server a first UE 120, which communicates with the first eNB 110 through communication link 122.

Similarly, a second eNB 130 communicates with a second UE 140 through a communication link, shown by arrow 142.

In the example of FIG. 1, first eNB 110 may be a macro eNB and second eNB 130 may be a pico eNB within the macro cell. Alternatively, first eNB 110 may be neighboring eNBs within a homogenous network, for example.

A wired or wireless backhaul link 144 is used to provide communication and synchronization between the first eNB 110 and second eNB 130. In particular, the backhaul link 144 may be used to synchronize communications between the eNBs, as described below.

As shown in the example of FIG. 1, each element includes a protocol stack for the communications with other elements. In the case of first eNB 110, the first eNB includes a physical layer 150, a medium access control (MAC) layer 152, a radio link control (RLC) layer 154, a packet data convergence protocol (PDCP) layer 156 and a radio resource control (RRC) layer 158.

Similarly, the second eNB includes the physical layer 160, MAC layer 162, RLC layer 164, PDCP layer 166 and RRC layer 168.

In the case of first UE 120, the first UE includes a physical layer 170, a MAC layer 172, an RLC layer 174, a PDCP layer 176, an RRC layer 177 and a non-access stratum (NAS) layer 178.

Similarly, the second UE 140 includes the physical layer 180, the MAC layer 182, the RLC layer 184, the PDCP layer 186, the RRC layer 187 and the NAS layer 188.

Communications between the entities, such as between first eNB 110 and first UE 120, generally occur within the same protocol layer between the two entities. Thus, for example, communications from the RRC layer at first eNB 110 travels through the PDCP layer, RLC layer, MAC layer and physical layer and gets sent over the physical layer to first UE 120. When received at first UE 120, the communications travel through the physical layer, MAC layer, RLC layer, PDCP layer to the RRC level of first UE 120. Such communications are generally done utilizing a communications sub-system and a processor, as described in more detail below.

The present disclosure is described below with regard to the Third Generation Partnership Project (3GPP) Long Term Evolution (LTE) architecture. However, this is not meant to be limiting in other radio technologies and systems could be applied to the embodiments described herein.

3GPP defines an Evolved Universal Mobile Telecommunication System (UMTS) Radio Access Network (E-UTRAN) for providing wireless radio access between user equipment devices and an Evolved Packet Core (EPC) network.

Figure 2:
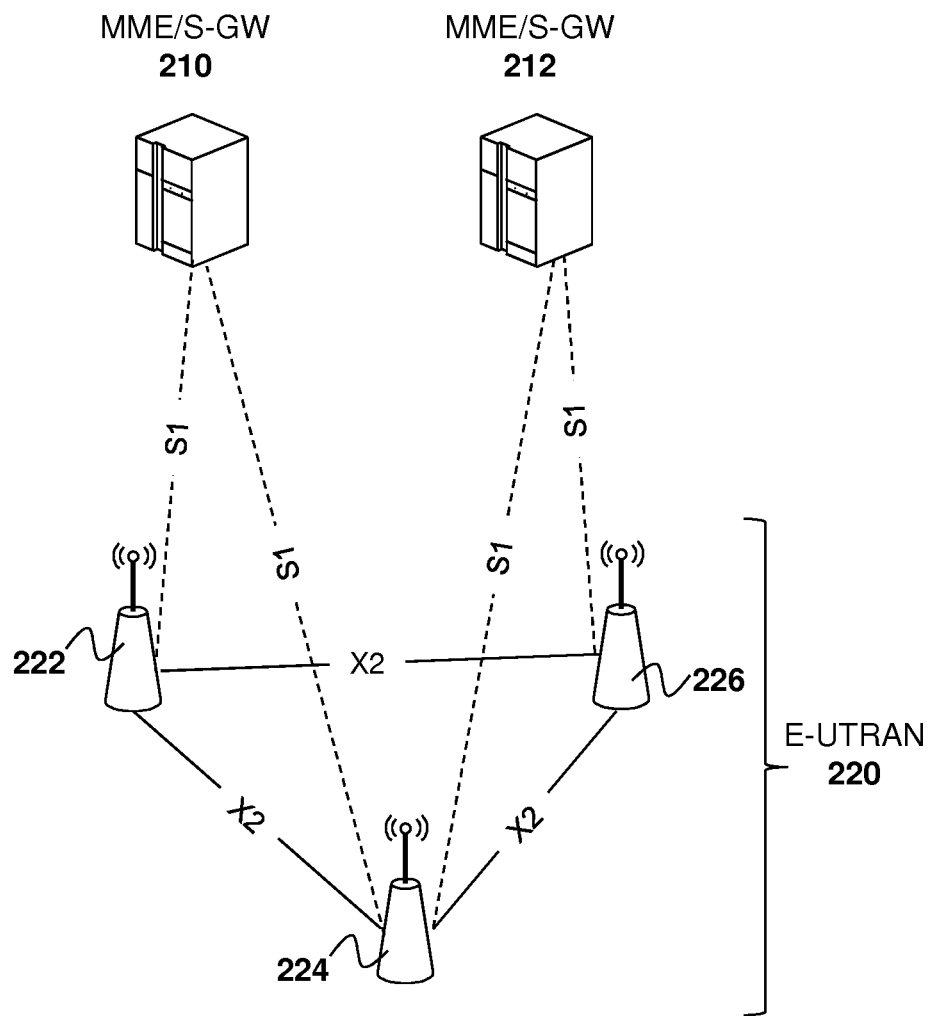
FIG. 2 is a block diagram showing an example network architecture.

As shown in FIG. 2, the EPC comprises one or more core network nodes 210 and 212 which may include a serving gateway (S-WG) or a Mobility Management Entity (MME).

The E-UTRAN 220 comprises one or more eNBs. The example of FIG. 2 includes three eNBs, namely eNB 222, 224 and 226.

eNBs are connected to the core network nodes 210 and 212 via an S1 interface and may carry user plane and control plane data. The eNBs are directly interconnected with other eNBs through an X2 interface in the example of FIG. 2. The X2 interface may be used to provide coordination amongst eNBs within an E-UTRAN.

In some embodiments, an eNB may not have an X2 interface with another eNB, in which case signaling may be sent through the S1 interference to the other eNB.

In 3GPP LTE, time and frequency physical resources for radio transmissions are typically defined in terms of resource elements (RE) and an RE is defined as a frequency unit of one sub-carrier of an OFDM waveform (for downlink) or a single carrier frequency division multiple access/discrete Fourier transform spread OFDM (SC-FDMA/DFT-SOFDM) waveform (for uplink) during one OFDM or SC-FDMA symbol in time.

In an LTE system, a sub-carrier may comprise one 15 kHz unit of frequency resource, for example. An OFDM or SC-OFDMA symbol may comprise a basic OFDM with a cyclic prefix (CP) appended at the beginning of the symbol. The duration of the OFDM symbol including the cyclic prefix may vary depending on the system configuration.

In one example of an LTE system with a normal cyclic prefix, the duration of the OFDMA symbol including the CP is approximately 71.4 microseconds. This is however not limiting and the present disclosure could be related to any symbols.

Frequency resources are typically allocated by the system in groups of 12 sub-carriers, termed a physical resource block (PRB). A PRB is typically 180 kHz wide. Time resources are allocated by the system in units of 1 millisecond sub-frames. Each sub-frame may comprise two slots, each further comprising 6 or 7 OFDM symbols depending on the system configuration.

Figure 3:
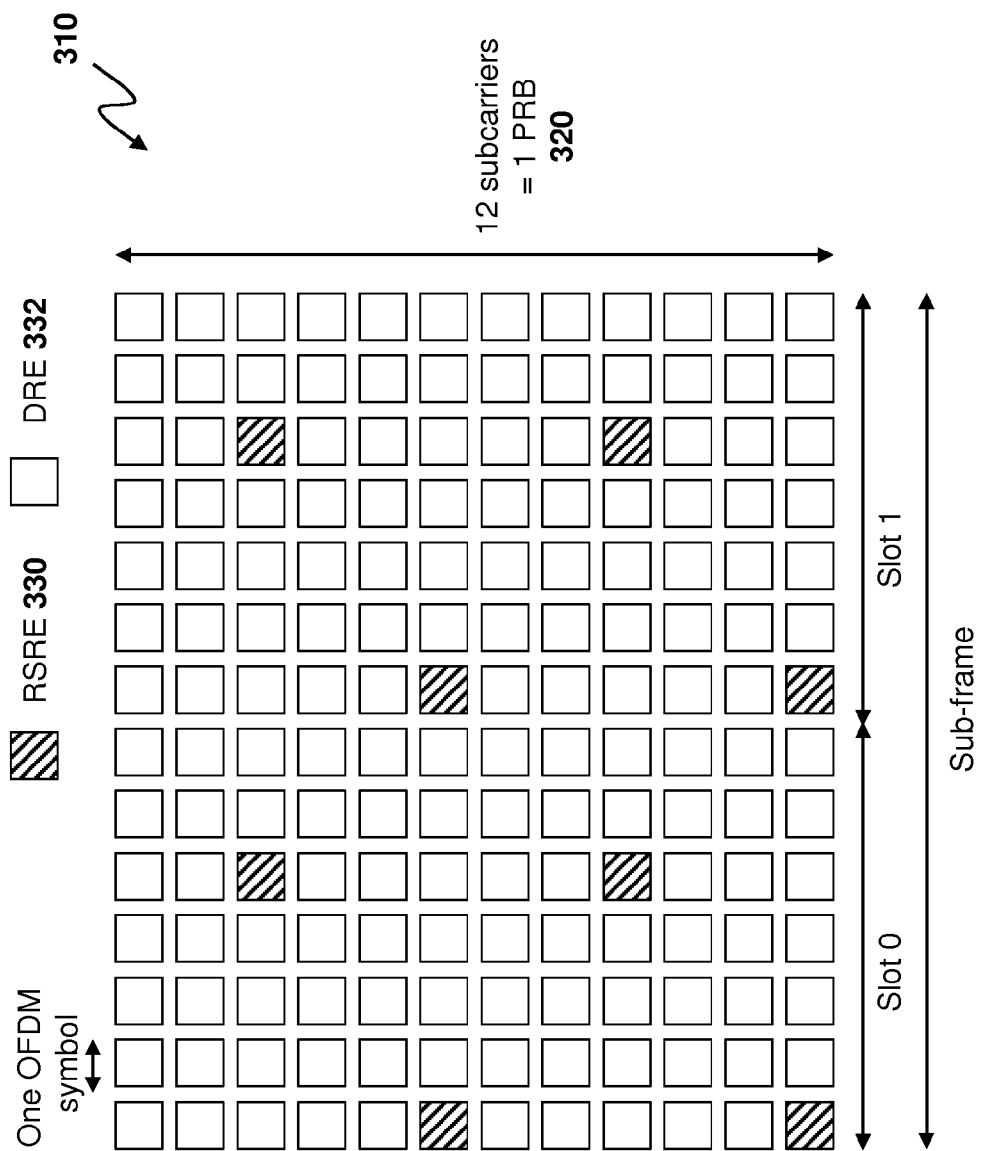
FIG. 3 is block diagram of a resource block.

Reference is now made to FIG. 3, which shows an example of a time and frequency resource block for downlink comprising one PRB and one sub-frame. The one PRB and one sub-frame are referred to herein as a "PRB allocation unit".

Thus, in accordance with FIG. 3, resource block 310 comprises two slots, namely slot 0 and slot 1.

On the vertical axis 320 12 sub-carriers having 15 kHz spacing make up 180 kHz. On the horizontal axis, each slot includes seven OFDM symbols, leading to 14 OFDM symbols in the RB.

Some of the REs within the RB allocation unit are used for transmission of common reference signals (CRS) from antenna port 0. These REs are referred to as Reference Signal Resource Elements (RSRE) 330. Other REs are referred to hereon as Data Resource Elements (DRE) 332.

In the 3GPP LTE release 10, a set of reference symbols were introduced, namely the channel state information (CSI) reference symbols (RS). The CSI-RS are used for channel measurement and for deriving feedback on channel quality and spatial properties, as needed. The feedback based on the CSI-RS is used for different transmission modes, such as single-cell single-user (SU) multiple input multiple output (MIMO) and multi-user (MU) MIMO, as well as coordinated multi-point (CoMP) transmission.

CSI-RS patterns adopt the base pattern with length-2 time domain orthogonal cover code (OCC) for each antenna port. The patterns have a nested structure, where patterns with smaller number of CSI-RS ports are a subset of the pattern with a larger number of CSI-RS ports. Multiple patterns or configurations are available for the network to provide varying reuse factors. The parameters for the CSI-RS such as the number of CSI-RS ports, the configuration index, the duty cycle and the sub-frame offset are explicitly signaled through higher layer signaling.

Figure 4:
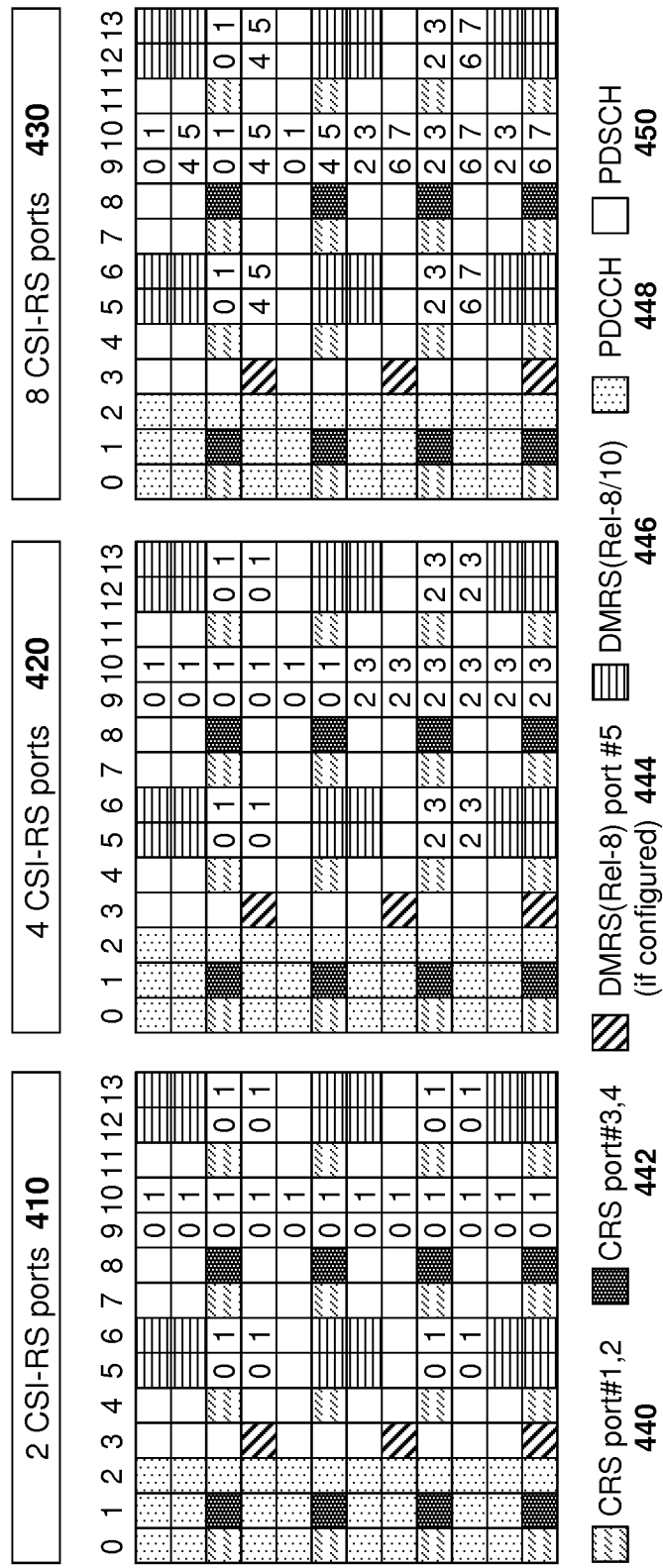
FIG. 4 is a block diagram of resource blocks having CSI-RS patterns.

Reference is now made to FIG. 4, which shows an example of CSI-RS configuration for normal cyclic prefix. In particular, in FIG. 4 resource block 410 shows a pattern with two CSI-RS ports configured, resource block 420 shows a resource block having four CSI-RS ports configured and resource block 430 shows an example with eight CSI-RS ports configured.

As seen in the example of FIG. 4, various resource elements are used for CRS ports 1 and 2, shown by reference 440, resource elements are used for CRS ports 3 and 4, shown by reference 442, resource elements are used for demodulation reference symbol (DMRS) port 5, if configured, shown by reference 444, various REs are used for DMRS release 9 or 10, shown by reference 446, various resources are used for the Physical Downlink Control Channel (PDCCH), shown by reference 448 and various resources are used for the Physical Downlink Shared Channel (PDSCH), shown by reference 450.

In the case of CoMP, the UE may need to measure the channel quality and other metrics for feedback based on CSI-RSs from all cells within the CoMP measurement set. This differs from LTE Release 8 in which a UE only needed to measure the channel based on the CRSs from the serving cell.

Thus, a UE may need to reach an acceptable measurement accuracy based on CSI-RSs that are experiencing more serious interference, since the received power from multiple cells are in general lower than the CRS power from the serving cell. Accordingly, it may be better for the CSI-RSs of multiple cells to be orthogonal (resource orthogonal) to each other. Moreover, CoMP UEs need to measure not only the channel of the serving cell but also channels of other cooperative cells.

In one embodiment a zero power CSI-RSs may be used to mute the data REs colliding with the CSI-RS REs of the other cells within the same CoMP cell cluster. This is done in order for the CSI-RS of each cell not to interfere with the strong interference due to the data from cooperative cells. This ensures orthogonality among inter-cell CSI-RSs in a synchronized cell setting.

Interference Rejection Combining

One interference rejection technique typically used in wireless systems is referred to as interference rejection combining (IRC). The example of FIG. 5 below is with regard to IRC given the context of 3GPP LTE downlink transmission. However, such example is not limiting and the use of IRC in other contexts applies equally to the embodiments described herein.

Figure 5:
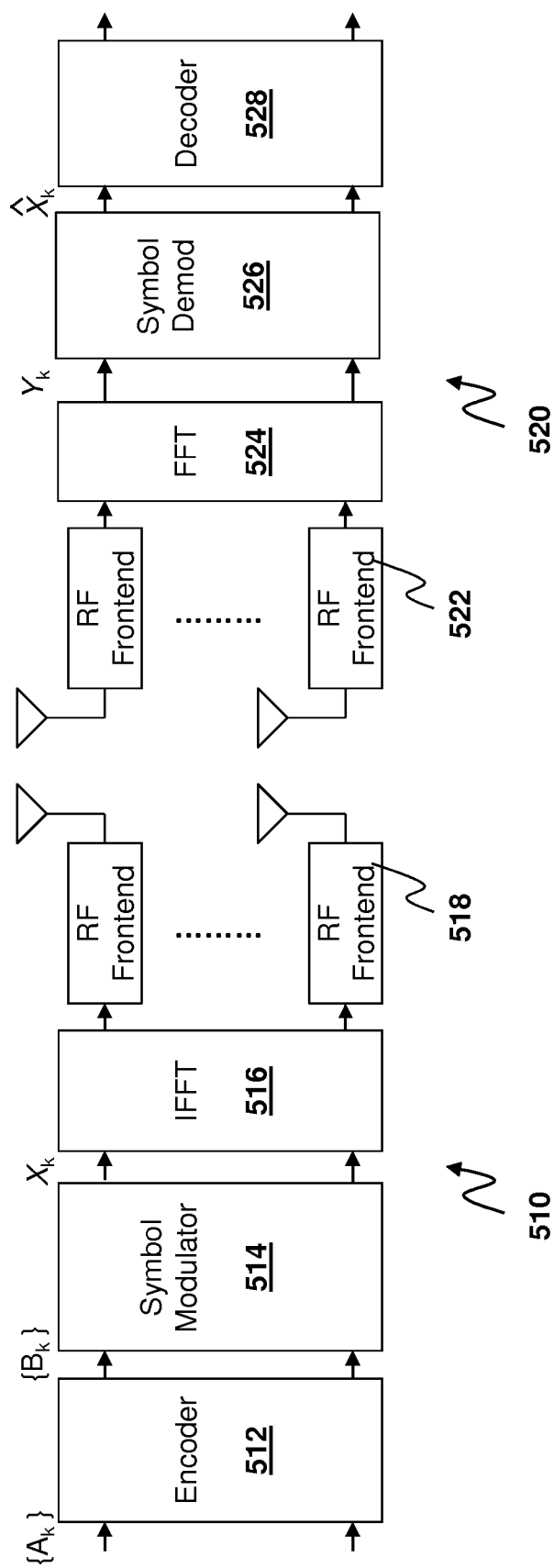
FIG. 5 is a block diagram of a transmitter and receiver.

Referring to FIG. 5, a transmitter 510 includes an encoder 512, a symbol modulator 514, and an inverse fast Fourier transform (IFFT) block 516.

The output from IFFT 516 is divided between $N_T$ transmit antennas, shown as radio frequency (RF) frontend 518 in FIG. 5.

Receiver 520 includes $N_R$ receive antennas, shown by RF frontend 522.

Further, a fast Fourier transform (FFT) block 524, symbol demodulation block 526 and a decoder block 528 are used to decode the received signal. The $M_T$ encoded modulated symbols are represented as $X_k$.

Further, after the fast Fourier transform at the receiver, the symbols are referred to as $Y_k$ and the $M_T$ decoded symbols are represented as $\hat{X}_k$.

The signal model is given by:

$$Y_k = H_k X_k + B_k + N_k \quad (1)$$

where $Y_k$ is the received signal at subcarrier k on $N_H$ antennas, $H_k$ is $N_R \times M_T$ channel matrix at subcarrier k, $B_k$ is the received interference signal at subcarrier k, $X_k$ is the transmitted $M_T$ data symbols and $N_k$ is a vector $N_R$ of white zero mean complex Gaussian noise samples. $V_k$ is defined as the noise plus interference signal as defined below:

$$V_k = B_k + N_k \quad (2)$$

One possible algorithm for interference rejection would be the use of minimum mean squared error (MMSE) receiver where the second order statistics of the interference are incorporated. The output of the MMSE receiver is given by:

$$\hat{X}_k = H_k^H (H_k H_k^H + R_{vk})^{-1} Y_k \quad (3)$$

$R_{vk}$ is the covariance matrix of the noise plus interference, $E[V_k V_k^H]$, where $E[x]$ represents the expectation operator.

An efficient way of implementing the receiver of Equation (3) above is by using Cholesky decomposition of $R_{vk}$. Since $R_{vk}$ is Hermitian and strictly positive definite, $R_{vk}$ can be expressed using Cholesky decomposition as follows:

$$R_{vk} = L_{vk} L_{vk}^H \quad (4)$$

Where $L_{vk}$ is a lower triangular matrix with strictly positive diagonal entries. Equation (3) above can be re-written as follows:

$$\hat{X}_k = H_{v,k}^H (H_{v,k} H_{v,k}^H + I_{N_R})^{-1} Y_{v,k} \quad (5)$$

Where $H_{v,k} = L_{vk} H_k$, $Y_{v,k} = L_{vk} Y_k$ and $I_{N_R}$ is an identity matrix of size $N_R \times N_R$. This formulation is similar to the least-squares formulation which can be solved through a QR decomposition.

The above therefore requires an estimate of the covariance of the dominant interferers. The effectiveness of the interference rejection at the receiver depends on the accuracy of the estimate. Further, since fourth generation cellular systems are typically primarily packet data transmission systems, interference from neighboring cells may be constantly changing and based on radio resource scheduling at neighboring eNBs.

While dominant interfering signals may be suppressed by estimating the channel weight of the one dominant interferer for one resource element and subsequently subtracting the interfering signals computed either by successive cancellation or joint detection techniques, such processing is complex and dependent on the accuracy of channel weights.

In other embodiments, known transmitted symbols from serving cells can be used to find the covariance of the dominant interferers by subtracting the known transmitted symbols from received signals after channel estimation. However, without proper coordination between cells, such estimates are inaccurate.

Based on the above, two solutions are provided. A first is a network assisted interference rejection combining approach. A second is a UE assisted interference avoidance approach.

Network Assisted Interference Rejection Combining

In accordance with one embodiment of the present disclosure, the dominant transmission from the neighbor cells can be suppressed by interference rejection combining (IRC). For example, such interference rejection combining may be done by way of equations 1-3 above.

The IRC technique involves the estimation of the interference covariance matrix $R_{vk}$ for the k th resource element (RE)/resource block (RB) or resource block group (RBG).

There are various ways to estimate the $R_{vk}$. For example, the residual interference plus noise can be estimated during known symbol (RS symbols) transmission from the serving cell in accordance with equations 6 and 7 below. In the equations, k represents a group of REs over which the channel has not changed significantly.

$$\hat{R}_{vk} = \frac{1}{\rho} \sum_{i=0}^{\rho-1} \hat{V}_i \hat{V}_i^H \quad (6)$$

Where the elements of $\hat{V}_k$ are estimated as follows:

$$\hat{V}_{kl} = Y_{kl} - \hat{H}_{kl} X_k \text{ for } l=0, \ldots, N_R-1 \quad (7)$$

Where $Y_{kl}$ is the received signal over the k th RE and l th receive antenna and $\hat{H}_{kl}$ is the estimated channel weight over the k th RE and l th receive antenna. $X_k$ is the known symbol transmitted over one of transmit antennas from the serving cell. $\rho$ represents the number resources elements/RBs over which $V_k$ is estimated.

Once the interference covariance matrix $R_{vk}$ has been estimated, proprietary receiver algorithms may be used, for example, to decode the signal.

In 3GPP LTE, known RS symbols are transmitted by the eNB to facilitate various measurements, such as channel estimation and link quality estimation, among other factors. For example, the channel weight across the system bandwidth can be estimated using CRS and subsequently an estimate of the $R_{vk}$ from the known CRS transmitted by the serving cell can be made. However, the CRS transmitted by the interfering cells should be coordinated with the serving cell such that the data symbols are transmitted from the neighbor cells in REs over which CRS is transmitted by the serving cell.

In one embodiment, in the case where both the cell-identifiers for the serving and neighbor cells are equal, modulo 6, the estimation of the interference might not be possible since the data power and the RS power might be different. Moreover, in OFDM systems, channel estimation accuracy may be an issue, especially at low signal to noise ratio (SNR) regions or in high frequency selective channels. Hence, most decision-directed methods to estimate the interference such as the detection of the pilot signal and suppressing it from the received signal may lead to error propagation.

In an alternative embodiment, instead of using the CSI-RS to improve accuracy, zero-power CSI-RS could also be used to improve the accuracy of the second term of equation 7. However, zero-power CRS cannot replace the zero sub-carriers scheme as described in the present disclosure. This is because the CSI-RS are sparse in time, CSI-RS are not flexible and always occupy the whole bandwidth and a zero-power CSI-RS is configured only in cells containing non-zero-power CSI-RS. No mechanism exists to coordination zero-power CSI-RS among adjacent cells since the CSR-RS are typically used in a CoMP scenario where coordination between cells is done through a fibre optic backhaul.

As expressed in equation 7 above, the accuracy of the estimated $R_{vk}$, $\hat{R}_{vk}$, is dependent on the number resource elements or resource blocks used in the estimation. On the other hand, the channel over the REs or RBs should remain constant or nearly constant, which is speed-dependent or radio environment dependent. The UE could determine the parameter internally.

In one embodiment, a simple estimation could be on a per RB basis. In other words, the UE may measure $\hat{R}_{vk}$ on each RB or only some RBs. In addition, resources over which the estimation is made could consist of the same transmission from a neighboring eNB. Here, the term "same transmission" refers to a data transmission between the same pair of neighboring eNBs and a UE.

Furthermore, based on the frequency selectivity and time selectivity of the wireless channel, the measurement averaging may be limited to those RBs over which the channel does not change significantly.

Based on the above, in a packet data system the accuracy of the estimate $\hat{R}_{vk}$ may vary based on the number of RBs over which the estimate is averaged, which in turn depends on the following factors:
Frequency selectivity of the wireless link between the serving cell and the UE;
Time selectivity of the wireless link between the serving cell and the UE; and resource scheduling at the dominant interferer.

For the first two factors, the frequency selectivity and time selectivity can be measured by the UE in selecting an appropriate averaging parameter, $\rho$. To incorporate the effect of the third factor in the estimation depends on coordination between the serving cell and the neighboring cell.

The accuracy of the estimated covariance matrix of the interferers can be improved, in accordance with the present disclosure, with the help of the network. The serving cell can be configured to transmit a cell specific RE. These REs may be configured such that: the transmit power of the REs is set to zero (i.e. NULL REs); and the neighboring cells which are operating on the same carrier frequency transmit finite power REs which are generally used for physical downlink shared channel (PDSCH) transmission.

Figure 6:
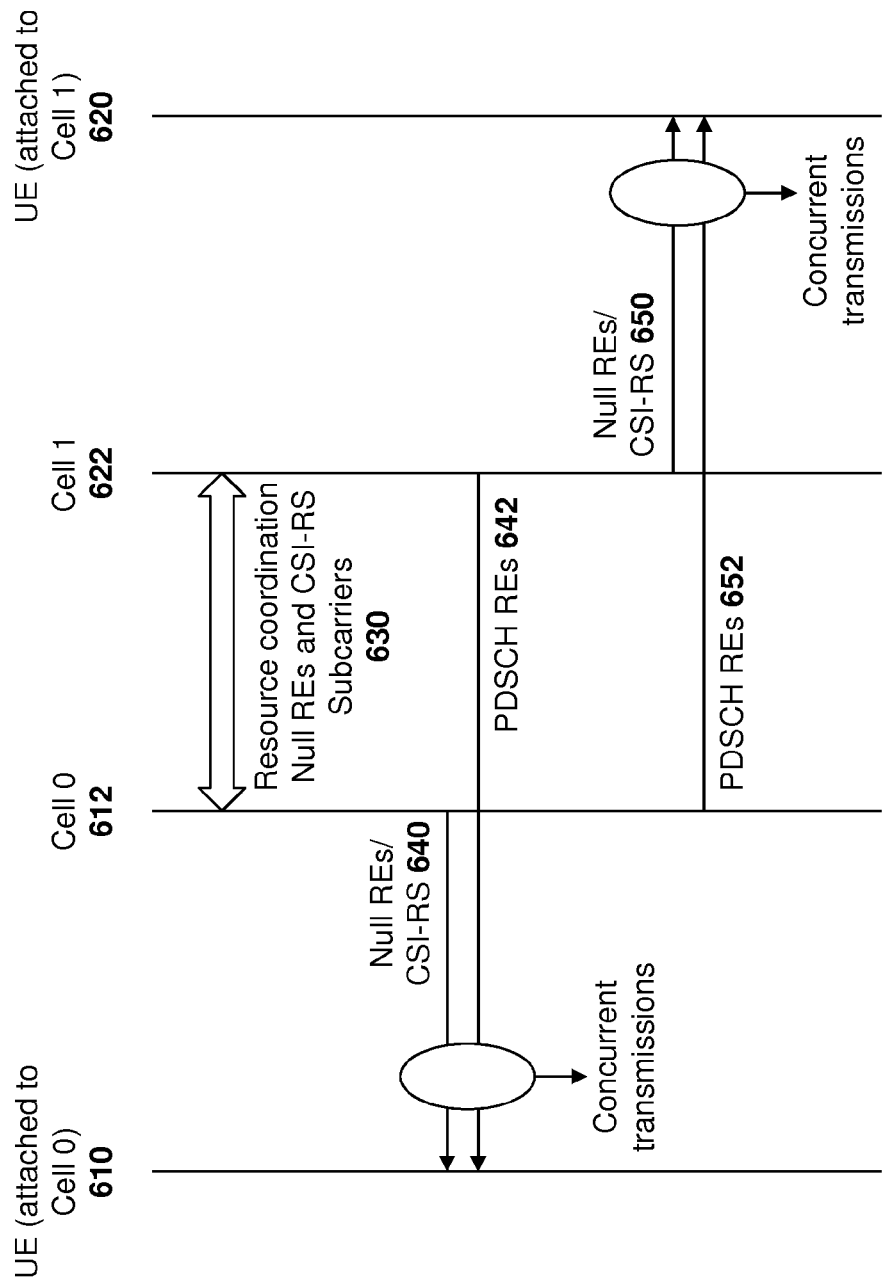
FIG. 6 is a flow diagram showing communication between a first UE and first cell and a second UE and second cell.

Reference is now made to FIG. 6, which illustrates coordination between the cells for covariance matrix estimation at the UE. In particular, a first UE 610 is attached to a first cell 612. Further, a second UE 620 is attached to a second cell 622.

Cell 612 and cell 622 perform resource coordination for NULL REs and CSI-RS sub-carriers, as shown at arrow 630.

Subsequently, cell 612 transmits a NULL RE/CSI-RS, shown by arrow 640, concurrent to the transmission by cell 622 of a PDSCH RE, shown by arrow 642. UE 610 receives the concurrent messages, but since there is zero-power from the serving cell, the UE only receives the error power. Thus, the covariance matrix can be estimated with accuracy.

Similarly, cell 622 transmits a NULL RE and a CSI-RS, as shown by arrow 650, concurrent to cell 612 transmitting a PDSCH RE, shown by arrow 652, to UE 620. The receiver can estimate the covariance matrix in accordance with equation 8 below.

$$\hat{R}_{vk} = \beta_0 \frac{1}{\rho_0} \sum_{i=0}^{\rho_0-1} \hat{V}_k(i)\hat{V}_k^H(i) + \beta_1 \frac{1}{\rho_1} \sum_{i=0}^{\rho_1-1} Y_k(i)Y_k^H(i) \quad (8)$$

In the above, $\rho_0$ and $\rho_1$ are the number of known REs and NULL REs transmitted from the serving cell. $\beta_0$ and $\beta_1$ are the relative reliability scale factors. The reliability factor $\beta_0$ can, for example, be obtained by observing the mean squared error of the channel estimator.

Figure 7:
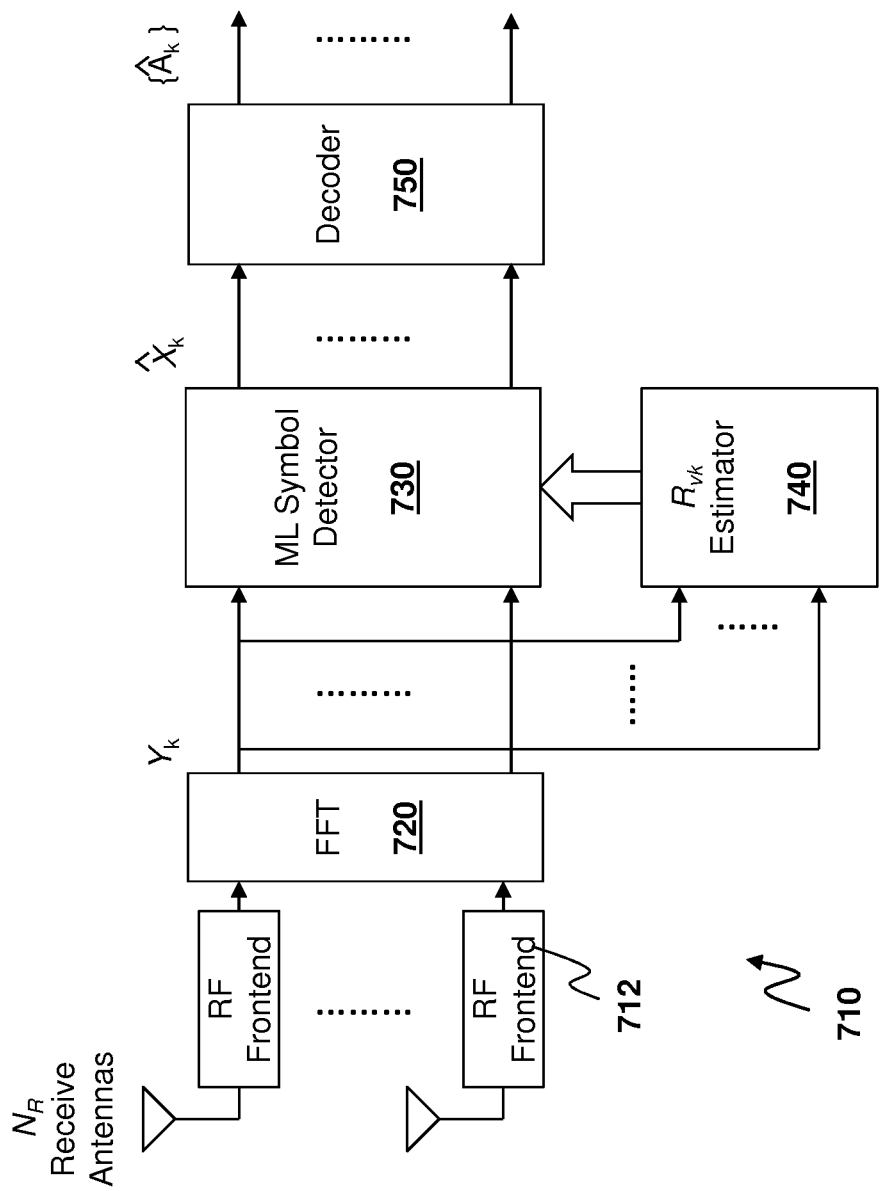
FIG. 7 is a block diagram of a modified receiver.

At the UE, a sample receiver 710 is shown with regard to FIG. 7. In particular, the receiver has NR receive antennas includes an RF frontend 712 for each antenna.

The received signals are provided to a fast Fourier transform block 720, which then provides the Yk output to both a maximum likelihood (ML) symbol detector block 730 as well as a covariance matrix estimator block 740. Output from the covariance matrix estimator block 740 is also provided to the ML symbol detector block 730.

The results from the ML symbol detector block 730 are provided to decoder 750, which produces outputted decoded symbols.

Figure 8:
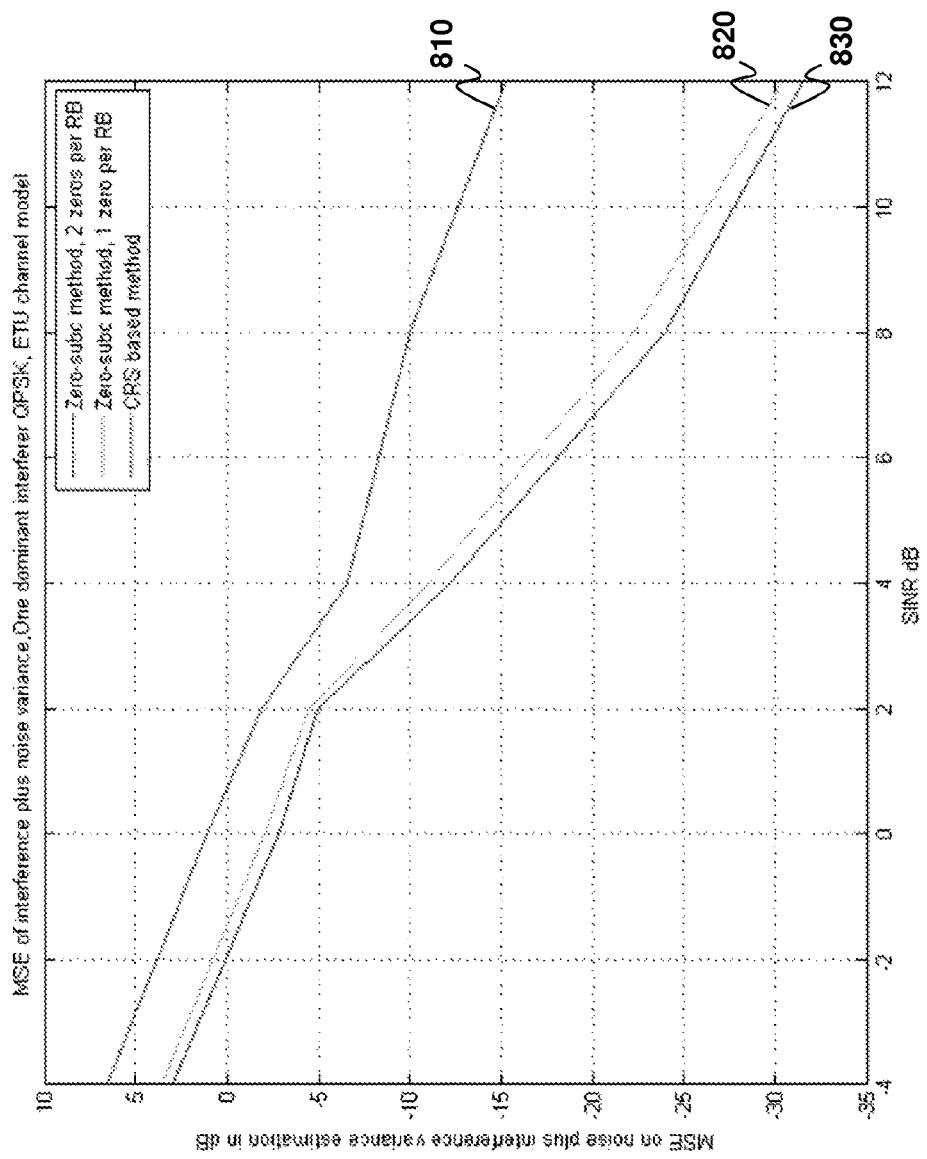
FIG. 8 is a plot showing mean squared error of interference plus noise variance for a system having one dominant interferer using QPSK.
Figure 9:
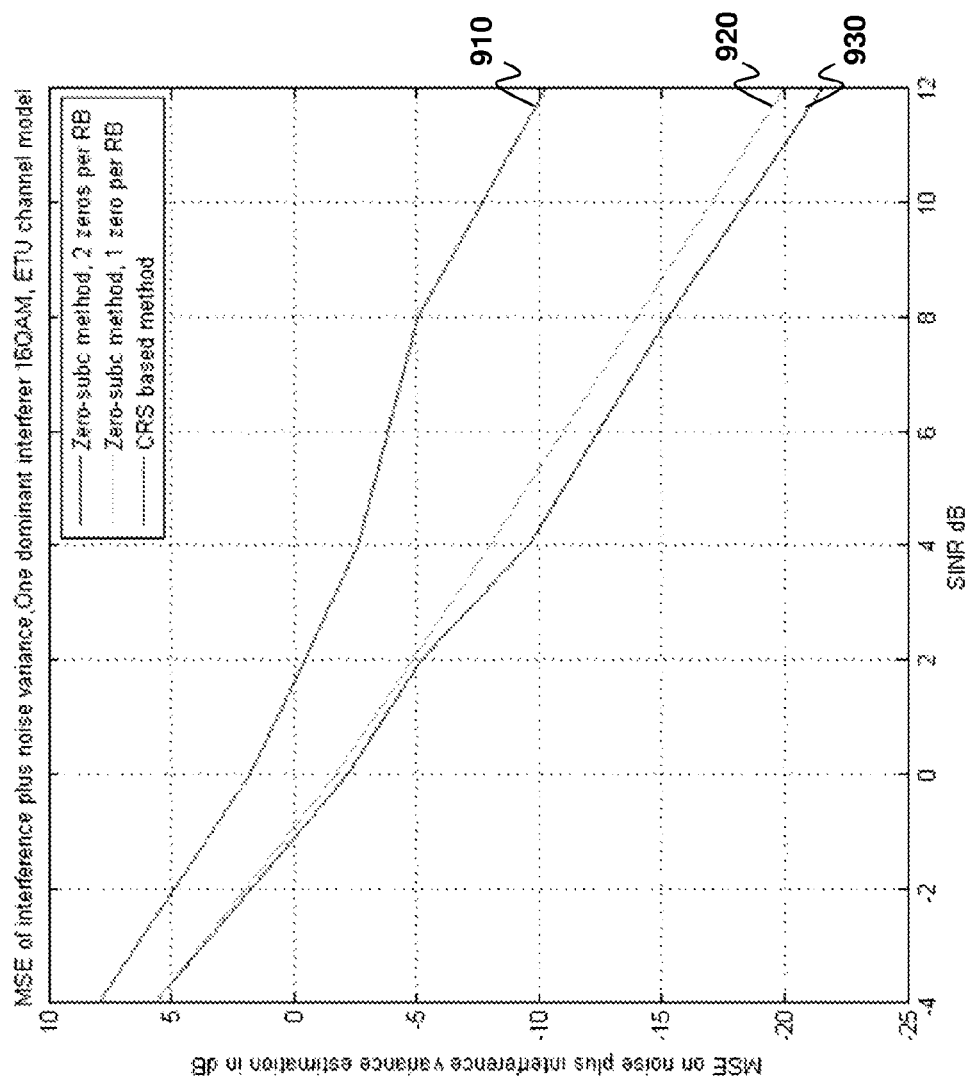
FIG. 9 is a plot showing mean squared error of interference plus noise variance for a system having one dominant interferer using 16-QAM

Reference is now made to FIGS. 8 and 9. FIG. 8 shows the mean squared error of interference plus noise variance estimations for a single interferer quadrature phase shift keying (QPSK) example and FIG. 9 shows the mean squared error of interference plus noise variance estimations for a single interferer 16-quadrature amplitude modulation (QAM) example.

In FIGS. 8 and 9, the means squared error of the noise plus interference variance estimate, defined as $E[\|R_v - \hat{R}_v\|^2]$, is depicted as a function of the single to interference noise ratio for different estimation methods. In particular, in FIG. 8, the CRS based method for estimation is shown by reference number 810, the zero-subcarrier method with one zero per RB is shown with reference numeral 820 and the zero-subcarrier method with two zeros per RB is shown by reference numeral 830.

Similarly, in FIG. 9, the CRS based estimation method is shown with arrow 910, the zero-subcarrier method with one zero per RB is shown with reference numeral 920 and the zero-subcarrier method with two zeros per RB is shown with reference numeral 930.

As seen in FIGS. 8 and 9, the zero-sub-carrier methods provide superior interference estimations to the CRS based method for both QPSK and 16-QAM situations.

The simulations of FIGS. 8 and 9 were performed for LTE downlink with a system bandwidth of 5 MHz. For simplicity, the simulations are performed for a 1×1 antenna configuration. When the covariance matrix is estimated using the CRS REs, the mean squared error is measured over all the CRS symbols transmitted by the single antenna. In simulations, the MMSE channel estimation is used. In an alternative embodiment, CSI-RS RE can also be used for the estimation.

For the case of the zero-power RE transmission, one or two NULL sub-carriers are configured at the serving cell.

Furthermore, an increase in the number of NULL carriers in the examples of FIGS. 8 and 9 improves accuracy. However, a large number of zero subcarriers decreases the spectral efficiency of the system, while a small number may lead to an inaccurate estimation of interference. Thus, in one embodiment, an optimization may be performed to find a number of zero-subcarriers that improves an estimation of interference while minimizing the loss of spectral efficiency.

Figure 10:
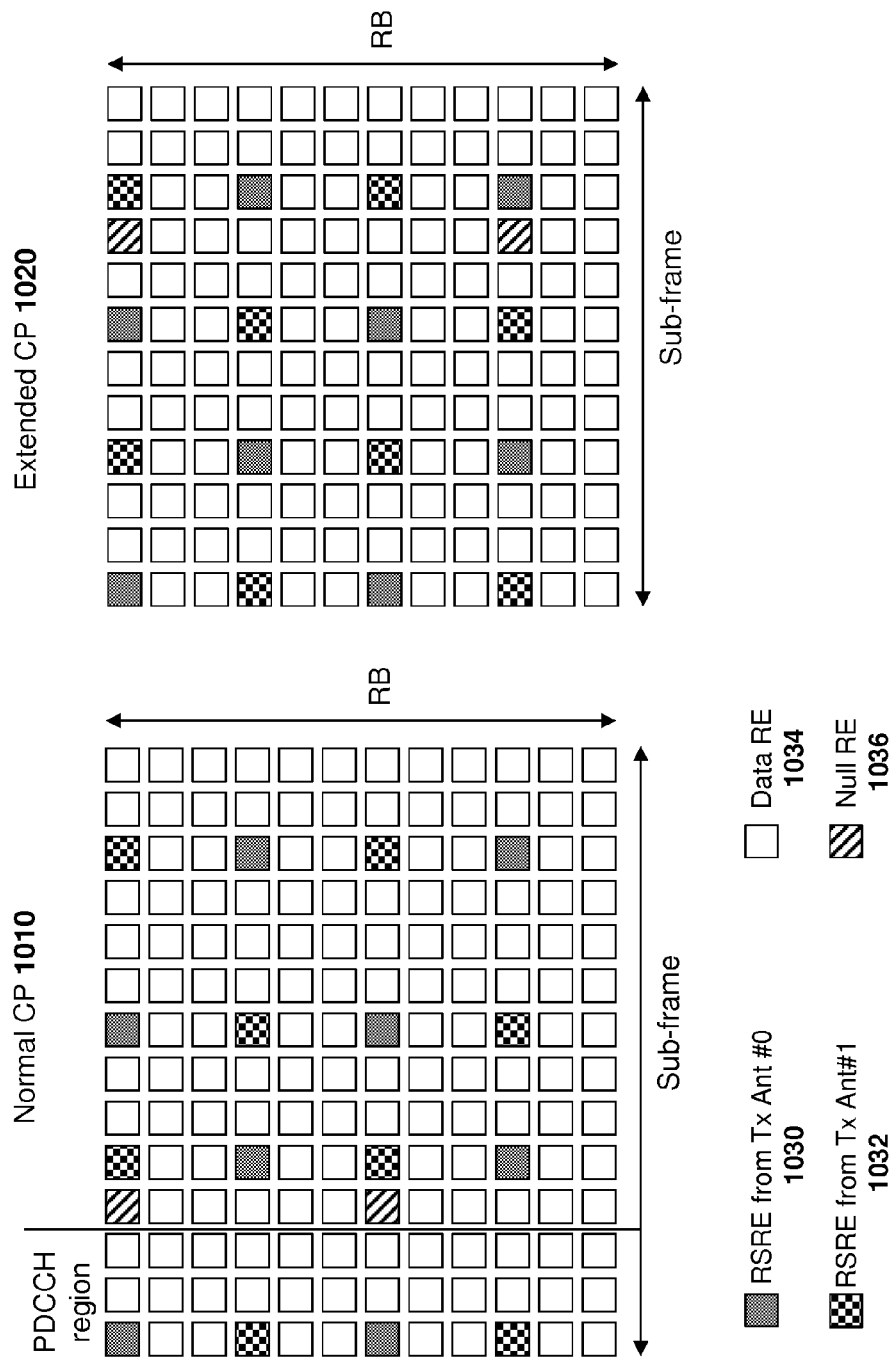
FIG. 10 is a block diagram of both normal and extended cyclic prefix resource blocks used for scheduling null resource elements.

In one embodiment, the new zero-power REs should not interfere with the assignment of other RS REs such as the CSI-RS, DMRS, and CRS among others. Reference is now made to FIG. 10 which shows one possible location for the zero-power REs.

In particular, in FIG. 10, various resource blocks are shown including a resource block 1010 having a normal cyclic prefix and resource block 1020 having an extended cyclic prefix.

In both the resource blocks 1010 and 1020, the RSRE from antenna #0 is shown with reference numeral 1030, the RSRE from antenna #1 is shown with reference numeral 1032. The data for the REs shown by reference numeral 1034 and the NULL RE is shown by reference numeral 1036.

In accordance with FIG. 10, the serving cell with a cell identifier, Cell_ID, sets the following REs, $X_{kl}$ to a zero transmit power in accordance with:

$$k = \mathrm{mod}(\mathrm{Cell\_ID}, 6) + i \text{ for } i = 0 \text{ and } 6 \quad (9)$$

Where l=3 i.e. the 3rd OFDM symbol in every subframe.

In general, the number of zero power REs can be configured based on UE feedback. For example, the number of zero-power REs can be increased to 4 per RB in accordance with the following. The serving cell with cell identity, Cell_ID, sets the following REs, $X_{kl}$ to zero transmit power in accordance with the following equation:

$$k = \mathrm{mod}(\mathrm{Cell\_ID}, 3i) + i \text{ for } i = 0, 1, 2, 3 \quad (10)$$

Where l=3 i.e. the $3^{rd}$ OFDM symbol in every subframe.

The zero-sub-carriers can also be configured across different symbols in one subframe to achieve more accurate interference covariance estimations in high-speed scenarios.

In general, the zero-subcarriers or zero REs may have the following attributes. First, the zero REs may need to cover a region of interference in time, frequency and space in a quasi-uniform manner in order to provide enough statistics for a receiver. Generally this may be done in two ways. In a first way, the eNB may not be aware of the nature of the interference and the zero subcarriers may uniformly cover the frequency bandwidth but also are introduced regularly in the time domain. In a second scenario, the eNB could be informed of the concentration of the interference in a determined frequency band and the zero-subcarriers may need to uniformly cover only that region.

A second attribute for the zero REs is that the eNB may schedule or transmit no data during the zero carrier RBs.

The third attribute for the zero REs is that the probability of zero RBs or subcarriers among neighboring cells should be low to ensure accurate interference measurements at the UE in any particular cell.

A further attribute may be that the zero-subcarriers may be rapidly reconfigured. In the case that the load or traffic in a cell is very light, the eNB may reuse any unused RB or subcarriers as zero sub-carriers. The location of these subcarriers could be signaled through RRC signaling, for example.

The location of the zero REs could be signaled by one or two additional bits in a DCI format. There may be several predefined configurations for the zero RE locations which correspond to different overheads of zero REs. One or two additional bits in DCI formats will indicate the configuration of the zero RE to be used for the corresponding PDSCH transmission. If the additional bits are set to 0, this may imply, for example, that there are no zero REs in the corresponding PDSCH transmission.

In the case that multiple eNBs (both serving and neighboring cell) are using zero sub-carriers, the zero subcarrier pattern could be exchanged among the eNBs. The serving eNB could notify the UE about zero sub-carrier patterns of the neighboring cells. The UE would then adjust its interference covariance estimation at those subcarriers to achieve better performance.

The UEs may further help the eNBs in identifying the best zero subcarriers configuration based on feedback measurements. Further, zero subcarrier configurations could be changed at any time through some RRC or broadcast messaging. Examples of metrics to be used by the eNB to configure zero-sub-carriers adaptively include the CSI and Reference Signal Receive Power/Reference Signal Receive Quality (RSRP/RSRQ). These measurements include the channel quality indicator (CQI) based on the SNR at the output of the new interference rejection algorithm, interference measurement power where the UE could report a form of Receive Signal Strength Indicator (RSSI) on the zero-subcarriers.

The i th stream SINR of the output of the MMSE-IRC receiver may be given by $$SINR_i \cong \frac{1}{g_{ii}} - 1 \quad (11)$$

Where $G_k = (H_k^H R_{vk}^{-1} H_k + I)^{-1}$ and $g_{ij}$ represents the element of G at the i th row and j th column.

For example, an eNB may introduce more zero subcarriers in a particular frequency sub-band since the CQI reporting was very low. The eNB may use other information to configure the zero subcarriers including the position of the UE close to the cell edge, scheduling information, load information, among other factors. The feedback from the UE may help the eNB to coordinate the zero sub-carriers. As indicated above, the zero subcarrier configuration of adjacent cells should not collide in general.

Further, a possible use of the feedback from the UEs would be to make zero subcarrier configurations specific for each UE. The zero subcarrier configuration may then cover only the bandwidth of transmission, and the UEs that do not suffer from interference will not be impacted in terms of spectral efficiency since they are not signaled with any zero subcarrier's configuration.

The density of the zero subcarriers in one RB may be suggested by the UE to the eNB. The UE may feedback the desired density of zero subcarriers based on its received SINR, channel frequency selectivity, speed and the receiver capability of the UE. For example, a high speed UE may need more zero-subcarriers spread in different symbols to have good estimation of the interference covariance. If a UE detects high frequency selectivity, it may need more zero-subcarriers across the scheduled frequency. Further, some advanced UEs may be able to perform channel estimation for neighboring interference cells at the received symbol, in which case no zero-subcarriers need to be used for higher spectral efficiency.

UE Assisted Interference Avoidance

In an alternative embodiment the MMSC-IRC receiver algorithm described above may be extended through the use of a structure of the interference plus noise covariance matrix. The approach utilizes an accurate estimate of the noise plus interference covariance matrix and hence the use of the zero subcarriers or resource blocks. Since the interference is structured, the structure can be taken advantage of. $R_{vk}$ may be expressed as $$R_{vk} = E\left(\sum_j H_{jk} H_{jk}^H\right) + \sigma_n^2 I \quad (12)$$

Where j stands for the interferer index. The $R_{vk}$ structure may be taken advantage of by using subspace techniques. In particular, $R_{vk}$ can be expressed using an eigenvalue decomposition as:

$$\hat{R}_{vk} = U_{vk} \Sigma_{vk} U_{vk}^H \quad (13)$$

In formula 13, $U_{vk}$ consists of the orthonormal eigenvectors of $R_{vk}$ and the diagonal matrix $\Sigma_{vk}$ represents the corresponding eigenvalues. Further, generally the follow characteristics exist:

$R_{vk}$ is $N_R$ dimensional square matrix.

$R_{vk}$ has $N_R - t$ eigenvalues equal to $\lambda_0$. If t=0, then the interference in the system is white (no colored noise).

The t eigenvectors corresponding to the dominant eigenvalues correspond to the interferer subspace. t depends on the transmission mode, the number of code words, the number of interferers and number of transmit antenna ports. The number of dominant eigenvectors may impact the multiplicity of the small eigenvector corresponding to the noise.

The eigenvectors associated with the dominant eigenvalues span the same algebraic subspace as the interference vectors.

The noise eigenvectors, associated with the non-dominant eigenvectors, are orthogonal to the interference subspace.

One way to cancel interference is to project the received signal onto the null space of the interference. The null space of the interference corresponds with the eigenvectors of the smallest singular value. Assume one dominant eigenvector, $u_{1k}$, of rank 1. In this case, $R_{vk}$ can be written as:

$$R_{vk} = [u_{0k} \vdots U_{0k}] \begin{bmatrix} \lambda_{1k} & 0 \\ 0 & \lambda_{0k} I \end{bmatrix} [u_{1k} \vdots U_{0k}]^H \quad (14)$$

Where $u_{1k}$ is the eigenvector corresponding to the dominant eigenvalue. $U_{0k}$ is $(N_R \times N_R - 1)$ matrix and I is $(N_R - 1 \times N_R - 1)$ identity matrix. In order to obtain a reduced size problem, the received signal is projected onto the null space of the interference as:

$$U_{0k}{}^H Y_k = U_{0k}{}^H (H_k X_k + I_k + N_k) = U_{0k}{}^H (H_k X_k + N_k) = \tilde{H}_k X_k + \tilde{N}_k \quad (15)$$

Where $\tilde{H}_k = U_{0k}{}^H H_k$ and $\tilde{N}_k = U_{0k}{}^H N_k$.

For the above, the dimension of the problem becomes $N_R - 1$ instead of $N_R$ since the dominant interferer has been canceled and the MMSC receiver could then be applied to the new signal model above.

Interference cancellation is improved with a smaller t and larger $U_{0k}$. It will be appreciated that the present technique involves interference cancellation and not rejection.

The implementation of the subspace based interference cancellation algorithm at the UE side may be made adaptive in the sense that in the case where the interference dimension is large or the interference estimation is not accurate enough to identify the interference null space, the UE would switch back to an IRC scheme as described above.

In the subspace approach, the UE is able to identify a number of dominant interferers. If this information is available to the serving cell and further exchanged between neighboring cells the system capacity may be improved. As explained above for the MMSE subspace based receiver, the UE is able to identify a number of strong interferers by comparing the interference plus noise covariance eigenvalues to the smallest eigenvalue corresponding to the noise subspace. By identifying the noise subspace, the UE is also able to identify the interference subspace and signature.

In some embodiments, the measured or estimated $R_{vk}$ can be fed back to the serving cell and shown below with regard to FIG. 11. The feedback information may consist of, but is not limited to: the number of dominant interferers; the identifiers of the dominant interferers; and a representation of the matrix U0k which represents the interference null space.

Figure 11:
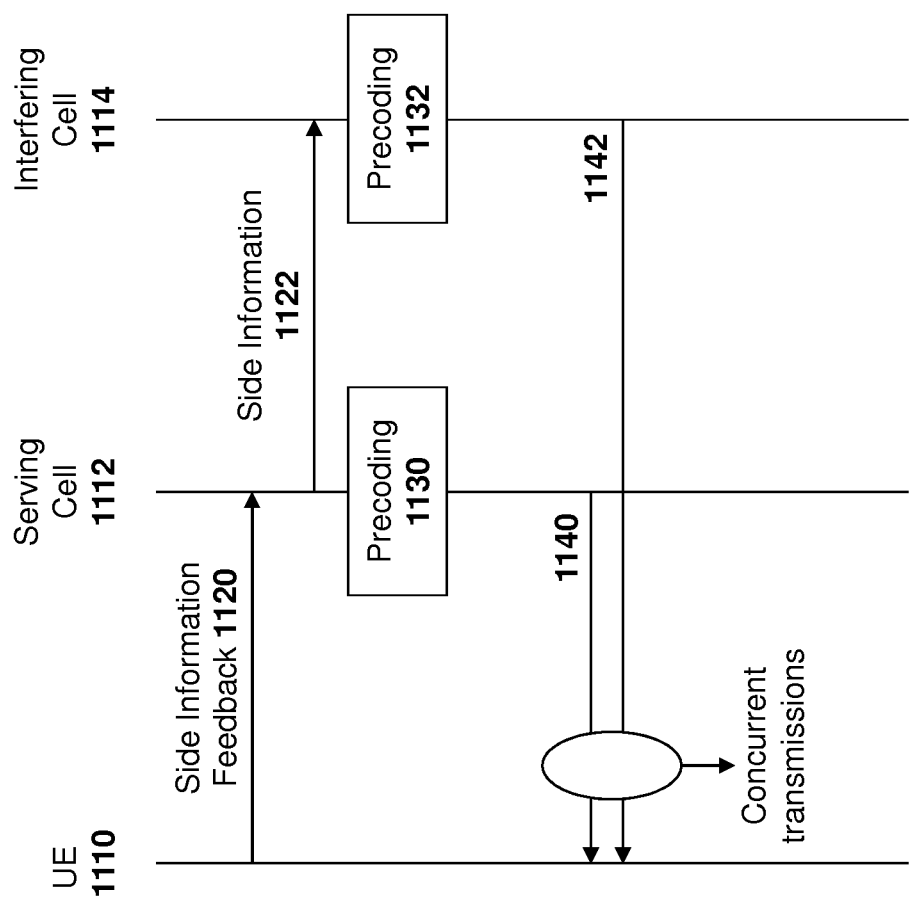
FIG. 11 is a flow diagram showing communication between a UE, a first cell and an interfering cell.

Referring to FIG. 11, UE 1110 communicates the side back information to serving cell 1112, as shown by arrow 1120.

Serving cell 1112 may then provide side information to interfering cell 1114 as shown by arrow 1122.

Based on the side information, precoding can occur both at the serving cell and the interfering cell, shown by blocks 1130 and 1132 respectively. Based on the precoding, the neighbor cells may project the input vector Djk onto U0k before transmitting to its served UE. The number of dominant interferers could be used by neighboring cells in order to coordinate their transmission to facilitate interference cancellation at the UE. For example, all cells could use a rank-1 transmission if UEs are experiencing severe interference. A rank-1 interference would be easier to estimate than to cancel, as indicated above.

Precoding the transmission from serving cell 1112 may be done concurrently with transmission from interfering cell 1114. The transmission from serving cell 1112 is shown by reference numeral 1140 and the transmission from interfering cell 1114 is shown by reference numeral 1142.

UE 1110 may, upon receipt of the concurrent transmissions then decode and remove the interference.

The UE could benefit from the interference cancellation sub-space approach in order to improve MIMO precoding and beam forming schemes. The subspace approach may improve the UE Precoding Matrix Indication (PMI) determination algorithm.

In a codebook based precoding scheme, the UE may use spatial signatures of the interference and the SINR level to pick the optimal PMI. Alternatively, the UE may feedback the information about the interference to the eNB. In that case, two solutions could be designed. In a first solution, the eNB uses a codebook based precoding and the UE could report its optimal PMI and additionally quantize the interference signature to a code word of the precoding codebook.

In a second scenario, the eNB does not use a codebook based pre-coding scheme. Rather, the eNB uses the same metrics reported by the UE to find an optimal precoding or beam forming weight. Hence the UE could quantize the interference subspace or the noise subspace, depending on which one has a smaller dimension, and report this information to the eNB. The eNB then could use some zero forcing (ZF)/MMSE criterion to determine the optimal beam forming weights.

In the case that CoMP joint transmission techniques are applied, the UE could also use the spatial signature of the interference and signal to interference noise ratio level to pick the best PMI for the neighboring CoMP cell to ensure the best reception from both the serving and the neighboring CoMP cell. Alternatively, the UE could feedback the quantized interference subspace. The serving eNB can pick the best PMI for the CoMP cell so that better CoMP reception can be achieved.

The above may be implemented by any network element. A simplified network element is shown with regard to FIG. 12.

Figure 12:
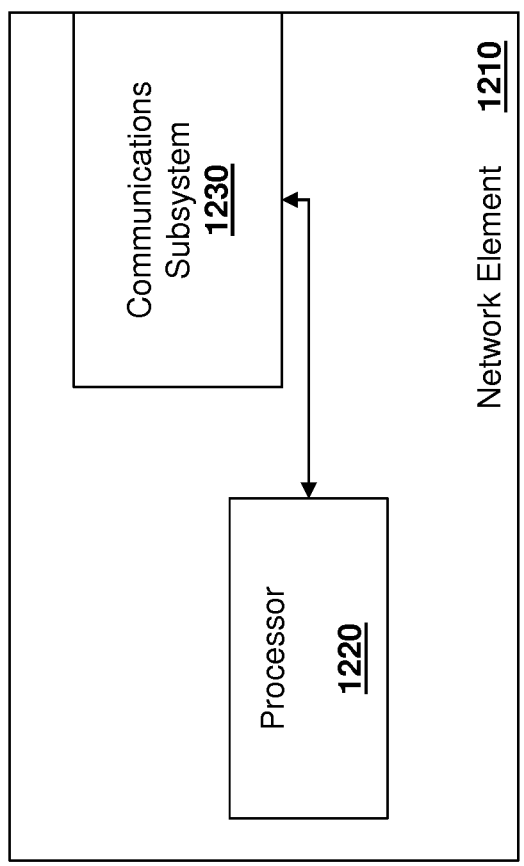
FIG. 12 is a simplified block diagram of a network element capable of being used with the embodiments of the present disclosure.

In FIG. 12, network element 1210 includes a processor 1220 and a communications subsystem 1230, where the processor 1220 and communications subsystem 1230 cooperate to perform the methods described above.

Further, the above may be implemented by any UE. One exemplary device is described below with regard to FIG. 13.

UE 1300 is typically a two-way wireless communication device having voice and data communication capabilities. UE 1300 generally has the capability to communicate with other computer systems on the Internet. Depending on the exact functionality provided, the UE may be referred to as a data messaging device, a two-way pager, a wireless e-mail device, a cellular telephone with data messaging capabilities, a wireless Internet appliance, a wireless device, a mobile device, or a data communication device, as examples.

Where UE 1300 is enabled for two-way communication, it may incorporate a communication subsystem 1311, including both a receiver 1312 and a transmitter 1314, as well as associated components such as one or more antenna elements 1316 and 1318, local oscillators (LOs) 1313, and a processing module such as a digital signal processor (DSP) 1320. As will be apparent to those skilled in the field of communications, the particular design of the communication subsystem 1311 will be dependent upon the communication network in which the device is intended to operate. The radio frequency front end of communication subsystem 1311 can be any of the embodiments described above.

Network access requirements will also vary depending upon the type of network 1319. In some networks network access is associated with a subscriber or user of UE 1300. A UE may require a removable user identity module (RUIM) or a subscriber identity module (SIM) card in order to operate on a CDMA network. The SIM/RUIM interface 1344 is normally similar to a card-slot into which a SIM/RUIM card can be inserted and ejected. The SIM/RUIM card can have memory and hold many key configurations 1351, and other information 1353 such as identification, and subscriber related information.

Figure 13:
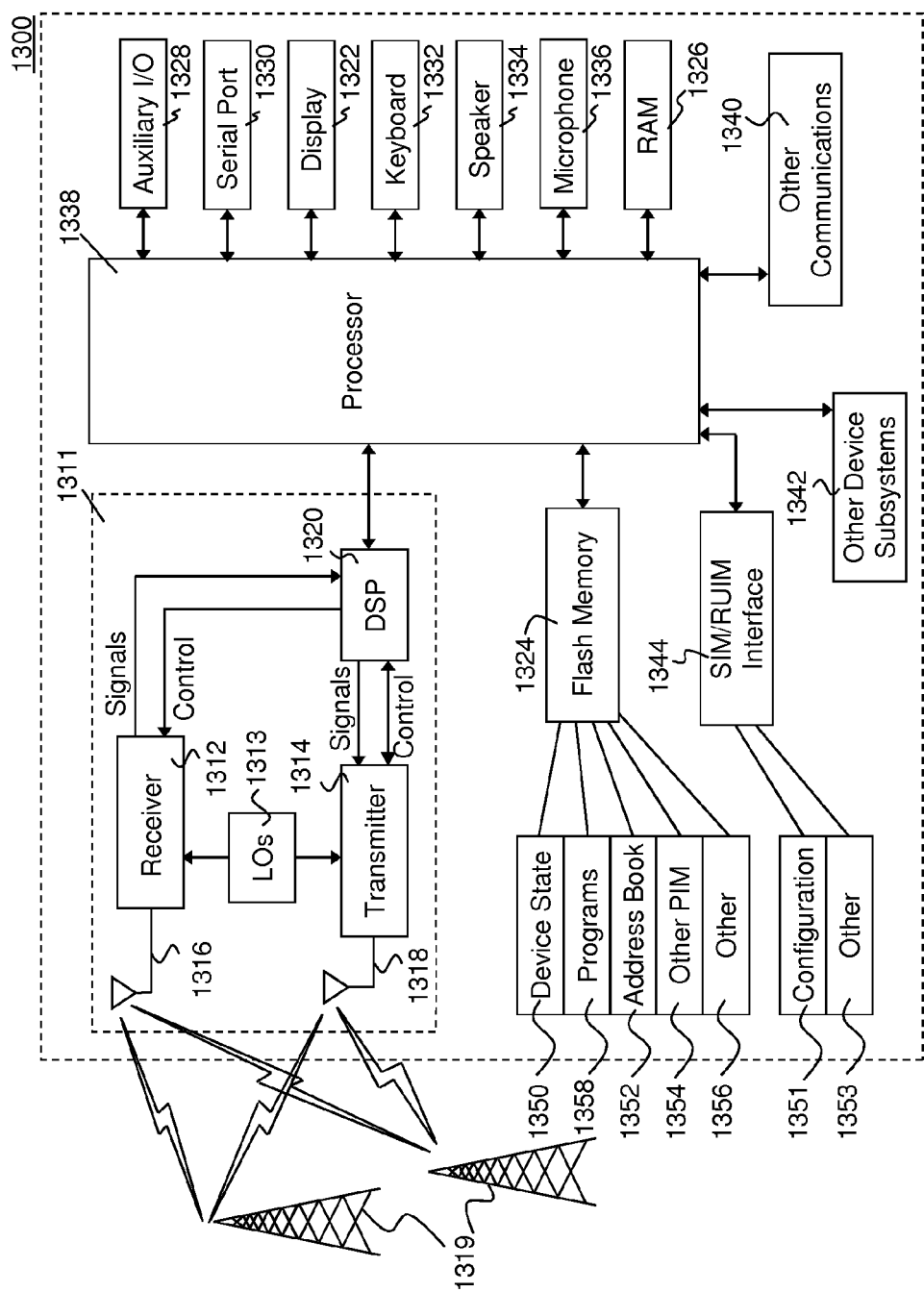
FIG. 13 is a block diagram of an example mobile device.

When required network registration or activation procedures have been completed, UE 1300 may send and receive communication signals over the network 1319. As illustrated in FIG. 13, network 1319 can consist of multiple base stations communicating with the UE.

Signals received by antenna 1316 through communication network 1319 are input to receiver 1312, which may perform such common receiver functions as signal amplification, frequency down conversion, filtering, channel selection and the like. A/D conversion of a received signal allows more complex communication functions such as demodulation and decoding to be performed in the DSP 1320. In a similar manner, signals to be transmitted are processed, including modulation and encoding for example, by DSP 1320 and input to transmitter 1314 for digital to analog conversion, frequency up conversion, filtering, amplification and transmission over the communication network 1319 via antenna 1318. DSP 1320 not only processes communication signals, but also provides for receiver and transmitter control. For example, the gains applied to communication signals in receiver 1312 and transmitter 1314 may be adaptively controlled through automatic gain control algorithms implemented in DSP 1320.

UE 1300 generally includes a processor 1338 which controls the overall operation of the device. Communication functions, including data and voice communications, are performed through communication subsystem 1311. Processor 1338 also interacts with further device subsystems such as the display 1322, flash memory 1324, random access memory (RAM) 1326, auxiliary input/output (I/O) subsystems 1328, serial port 1330, one or more keyboards or keypads 1332, speaker 1334, microphone 1336, other communication subsystem 1340 such as a short-range communications subsystem and any other device subsystems generally designated as 1342. Serial port 1330 could include a USB port or other port known to those in the art.

Some of the subsystems shown in FIG. 13 perform communication-related functions, whereas other subsystems may provide "resident" or on-device functions. Notably, some subsystems, such as keyboard 1332 and display 1322, for example, may be used for both communication-related functions, such as entering a text message for transmission over a communication network, and device-resident functions such as a calculator or task list.

Operating system software used by the processor 1338 may be stored in a persistent store such as flash memory 1324, which may instead be a read-only memory (ROM) or similar storage element (not shown). Those skilled in the art will appreciate that the operating system, specific device applications, or parts thereof, may be temporarily loaded into a volatile memory such as RAM 1326. Received communication signals may also be stored in RAM 1326.

As shown, flash memory 1324 can be segregated into different areas for both computer programs 1358 and program data storage 1350, 1352, 1354 and 1356. These different storage types indicate that each program can allocate a portion of flash memory 1324 for their own data storage requirements. Processor 1338, in addition to its operating system functions, may enable execution of software applications on the UE. A predetermined set of applications that control basic operations, including at least data and voice communication applications for example, will normally be installed on UE 1300 during manufacturing. Other applications could be installed subsequently or dynamically.

Applications and software may be stored on any computer readable storage medium. The computer readable storage medium may be a tangible or in transitory/non-transitory medium such as optical (e.g., CD, DVD, etc.), magnetic (e.g., tape) or other memory known in the art.

One software application may be a personal information manager (PIM) application having the ability to organize and manage data items relating to the user of the UE such as, but not limited to, e-mail, calendar events, voice mails, appointments, and task items. Naturally, one or more memory stores would be available on the UE to facilitate storage of PIM data items. Such PIM application may have the ability to send and receive data items, via the wireless network 1319. Further applications may also be loaded onto the UE 1300 through the network 1319, an auxiliary I/O subsystem 1328, serial port 1330, short-range communications subsystem 1340 or any other suitable subsystem 1342, and installed by a user in the RAM 1326 or a non-volatile store (not shown) for execution by the processor 1338. Such flexibility in application installation increases the functionality of the device and may provide enhanced on-device functions, communication-related functions, or both. For example, secure communication applications may enable electronic commerce functions and other such financial transactions to be performed using the UE 1300.

In a data communication mode, a received signal such as a text message or web page download will be processed by the communication subsystem 1311 and input to the processor 1338, which may further process the received signal for output to the display 1322, or alternatively to an auxiliary I/O device 1328.

A user of UE 1300 may also compose data items such as email messages for example, using the keyboard 1332, which may be a complete alphanumeric keyboard or telephone-type keypad, among others, in conjunction with the display 1322 and possibly an auxiliary I/O device 1328. Such composed items may then be transmitted over a communication network through the communication subsystem 1311.

For voice communications, overall operation of UE 1300 is similar, except that received signals would typically be output to a speaker 1334 and signals for transmission would be generated by a microphone 1336. Alternative voice or audio I/O subsystems, such as a voice message recording subsystem, may also be implemented on UE 1300. Although voice or audio signal output is generally accomplished primarily through the speaker 1334, display 1322 may also be used to provide an indication of the identity of a calling party, the duration of a voice call, or other voice call related information for example.

Serial port 1330 in FIG. 13 would normally be implemented in a personal digital assistant (PDA)-type UE for which synchronization with a user's desktop computer (not shown) may be desirable, but is an optional device component. Such a port 1330 would enable a user to set preferences through an external device or software application and would extend the capabilities of UE 1300 by providing for information or software downloads to UE 1300 other than through a wireless communication network. The alternate download path may for example be used to load an encryption key onto the device through a direct and thus reliable and trusted connection to thereby enable secure device communication. As will be appreciated by those skilled in the art, serial port 1330 can further be used to connect the UE to a computer to act as a modem.

Other communications subsystems 1340, such as a short-range communications subsystem, is a further optional component which may provide for communication between UE 1300 and different systems or devices, which need not necessarily be similar devices. For example, the subsystem 1340 may include an infrared device and associated circuits and components or a Bluetooth™ communication module to provide for communication with similarly enabled systems and devices. Subsystem 1340 may further include non-cellular communications such as WiFi or WiMAX.

The embodiments described herein are examples of structures, systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein.

The invention claimed is:

1. A method for interference management at a network node having cell identifier Cell ID within a wireless telecommunications network, the method comprising:
determining, with at least one other network node, a resource for covariance matrix estimation, the resource comprising a plurality of resource elements of a resource block identified by X where:
k=mod (Cell ID, 6)+i, for i=0 and 6; and
l=3;
indicating, to a user equipment, the resource utilizing at least one bit of a Downlink Control Information (DCI) to indicate one of a plurality of preconfigured resources;
transmitting to equipment from the network node, at zero power using the resource;
transmitting to the user equipment, from the at least one other network node, with a non-zero transmit power using the resource.

2. The method of claim 1, wherein the resource covers a region of interference in a generally uniform manner.

3. The method of claim 1, wherein no data is scheduled during a time period associated with the resource.

4. A network node having cell identifier Cell ID operating within a wireless telecommunications network, the network node comprising:
a processor; and
a communications subsystem,
wherein the processor and communications subsystem are configured to:
determine, with at least one other network node, a resource for covariance matrix estimation, the resource comprising a plurality of resource elements of a resource block identified by $X_{k,l}$, where:
k=mod (Cell ID, 6)+i, for i=0 and 6; and
l=3;
indicate, to a user equipment, the resource utilizing at least one bit of a Downlink Control Information (DCI) to indicate one of a plurality of preconfigured resources; and
transmit to the user equipment, at zero power using the resource;
wherein the at least one other network node, transmits to the user equipment with a non-zero transmit power using the resource.

5. The network node of claim 4, wherein the resource covers a region of interference in a generally uniform manner.

6. The network node of claim 4, wherein no data is scheduled during a time period associated with the resource.

7. A method for interference management at a user equipment operating within a wireless telecommunications network, the method comprising:
determine a resource utilizing at least one bit of a Downlink Control Information (DCI) received from a serving network node having a cell identifier Cell ID by selecting one of a plurality of preconfigured resources;
receiving a cell specific resource element from the serving network node on the resource;
receiving a resource element transmission from at least one interfering network node on the resource; and
estimating an interference covariance matrix for interference rejection combining based on the cell specific resource element from the serving network node and the resource element transmission from the at least one interfering network node;
wherein the cell specific resource element has zero power and is specific for the user equipment; and
wherein the resource comprises resource elements of a resource block identified by $X_{k,l}$, where:
k=mod (Cell ID, 6)+i, for i=0 and 6; and
l=3.

8. The method of claim 7, wherein the estimating assigns a weight based on reliability of a noise plus interference signal and wherein the weight is higher when the cell specific resource element has zero power.

9. The method of claim 7, further comprising signaling a desired number of cell specific resource elements with zero power.

10. A user equipment operating within a wireless telecommunications network, the user equipment comprising:
a processor; and
a communications subsystem,
wherein the processor and communications subsystem are configured to:
determine a resource utilizing at least one bit of a Downlink Control Information (DCI) received from a serving network node having a cell identifier Cell ID by selecting one of a plurality of preconfigured resources;
receive a cell specific resource element from the serving network node on the resource;
receive a resource element transmission from at least one interfering network node on the resource; and
estimate an interference covariance matrix for interference rejection combining based on the cell specific resource element from the serving network node and the resource element transmission from the at least one interfering network node;
wherein the cell specific resource element has zero power and is specific for the user equipment; and
wherein the resource comprises resource elements of a resource block identified by $X_{k,l}$, where:
k=mod (Cell ID, 6)+i, for i=0 and 6; and
l=3.

11. The user equipment of claim 10, wherein the processor and communications subsystem are configured to estimate by assigning a weight based on reliability of a noise plus interference signal and wherein the weight is higher when the cell specific resource element has zero power.

12. The user equipment of claim 10, wherein the processor and communications subsystem are configured to signal a desired number of cell specific resource elements with zero power.

* * * * *